US008134538B2

(12) United States Patent
Nakayama

(10) Patent No.: US 8,134,538 B2
(45) Date of Patent: Mar. 13, 2012

(54) TOUCH PANEL INPUT DEVICE AND PROCESSING EXECUTION METHOD

(75) Inventor: Takashi Nakayama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 523 days.

(21) Appl. No.: 12/356,956

(22) Filed: Jan. 21, 2009

(65) Prior Publication Data

US 2009/0231293 A1 Sep. 17, 2009

(30) Foreign Application Priority Data

Mar. 12, 2008 (JP) ................................ 2008-062471

(51) Int. Cl.
*G06F 3/041* (2006.01)
(52) U.S. Cl. ......... 345/173; 345/169; 345/175; 345/156
(58) Field of Classification Search .................. 345/173, 345/156
See application file for complete search history.

(56) References Cited

U.S. PATENT DOCUMENTS

| | | | | |
|---|---|---|---|---|
| 5,974,558 | A * | 10/1999 | Cortopassi et al. | 713/323 |
| 6,498,598 | B2 * | 12/2002 | Watanabe | 345/156 |
| 7,050,042 | B2 * | 5/2006 | Watanabe | 345/156 |
| 7,289,043 | B2 | 10/2007 | Takahashi | |
| 2003/0197689 | A1 * | 10/2003 | May | 345/173 |
| 2007/0040799 | A1 * | 2/2007 | Singh et al. | 345/156 |
| 2008/0062141 | A1 * | 3/2008 | Chandhri | 345/173 |
| 2008/0238949 | A1 * | 10/2008 | Shimaya | 345/684 |
| 2009/0198359 | A1 * | 8/2009 | Chaudhri | 700/94 |
| 2010/0169772 | A1 * | 7/2010 | Stallings et al. | 715/702 |
| 2010/0182243 | A1 * | 7/2010 | Singh et al. | 345/169 |

FOREIGN PATENT DOCUMENTS

JP 05-066885 3/1993

OTHER PUBLICATIONS

JP05066885 English translation SEKI HOROSHI Mar. 19, 1993.*

* cited by examiner

*Primary Examiner* — Van Chow
(74) *Attorney, Agent, or Firm* — Brinks Hofer Gilson & Lione

(57) ABSTRACT

A touch panel input device and a processing execution method eliminates wasteful operations of a user and increases user convenience. If a state determination unit (multiple key press detection unit) detects that multiple operation keys displayed on a touch panel screen were multiply pressed, an operation control unit (first processing execution control unit) controls execution of processing corresponding to any one of the plural operation keys. A waiting unit sets a state, which causes processing to wait for a user to make a selection instruction to select and execute processing corresponding to the other operation key. If the selection instruction is accepted, the operation control unit (second processing execution control unit) controls execution of processing corresponding to the selection instruction so as to select and execute the processing corresponding to the other operation key, following the multiple key press.

13 Claims, 13 Drawing Sheets

10

TOUCH PANEL INPUT DEVICE AND PROCESSING EXECUTION METHOD

PRIORITY CLAIM

This application claims the benefit of Japanese Patent Application No. 2008-062471, filed on Mar. 12, 2008, and which is incorporated by reference herein in its entirety.

BACKGROUND OF THE INVENTION

1. Technical Field

The present invention relates to a touch panel input device and a processing execution method, which are intended to display operation keys on a touch panel screen and facilitate depression of a predetermined operation key to control execution of target processing.

2. Description of the Related Art

In known conventional touch panel input devices, when a user presses an operation key displayed on a touch panel screen, an operation signal corresponding to the pressed operation key is generated to control execution of processing in various electronic devices. Examples of such a touch panel input devices include a resistive touch display, an optical touch display, and a capacitive touch display.

Other devices have been proposed, where even if plurality of operation keys displayed on a touch panel screen in close proximity are touched and selected, an operation key designated by a user can be effectively selected from among the plurality of operation keys (see Japanese Unexamined Patent Application Publication No. 5-66885, for example). The touch panel input device disclosed in Japanese Unexamined Patent Application Publication No. 5-66885 prioritizes a plurality of candidate operation keys touched by the user to select one operation key designated by the user from among the candidate operation keys based on the priorities and an analysis of the touch input.

Touch panel input devices are installed in many vehicles, for example, in use with navigation systems or AV systems. However, such touch panel screens are relatively small and thus, the corresponding operation keys are also small. In addition, a plurality of operation keys are arranged in close proximity to each other on the touch panel screen rendering it difficult to accurately touch a target position with a finger due, especially when the vehicle is moving.

Therefore, the user might fail to press an intended operation key on the touch panel screen and may inadvertently depress multiple keys. In this case, processing corresponding to an unintended operation key might be executed.

As described above, if a vehicle equipped with a touch panel screen causes vibrations, a user may not be able to properly depress the key as intended. Therefore, even if analysis of the touch input is performed, as disclosed in Japanese Unexamined Patent Application Publication No. 5-66885, an intended operation key cannot be always specified.

If processing, which corresponds to an unintended operation key is executed, a user may be required to return to the previous operation screen and press the intended operation key again, which is a wasteful operation. In that regard, the processing executed in response to the erroneous user operation (multiple key press of plural operation keys) must be cancelled, and processing corresponding to an intended operation key is executed instead. This is inconvenient to the user.

Next, the above disadvantages of know devices is described with reference to the drawings. FIG. 13 shows an example of a touch panel screen displayed on a display panel. The touch panel screen (operation screen) 10 displays nine thumbnail images (operation keys), by which a user selects a chapter to execute video playback processing of the chapter. Each thumbnail image corresponds to the opening scene of each chapter.

For example, consider that a user tries to reproduce a chapter in a movie recorded on a DVD by pressing an intended operation key (for example, No. 3) on the operation screen 10. In this case, if the user presses multiple operation keys (Nos. 3 and 6) by mistake, a chapter corresponding to the unintended operation key (No. 6) would be reproduced. The user must then return to the previous operation screen 10 and represses the intended operation key (No. 3). This is very inconvenient to the user.

Further, if it is difficult to identify which thumbnail image corresponds to a target chapter by merely viewing thumbnail images, a user may need to guess which thumbnail image corresponds to the target chapter, and may try to press one of the operation keys (thumbnail image) and then check to determine if a reproduced chapter is the correct choice. If the reproduced chapter is not the intended chapter, the user must return to the previous operation screen 10 each time. Again, this if very inconvenient for the user.

SUMMARY

If a user multiply presses plural operation keys displayed on a touch panel screen, the execution of unintended processing is cancelled and processing corresponding to an intended operation key is executed instead to eliminate wasteful operations of the user, and to increase user convenience. If a user multiply presses plural operation keys, the system confirms and executes intended processing while eliminating wasteful operations of the user.

If it is detected that plural operation keys displayed on a touch panel screen were multiply pressed, execution of processing corresponding to at least one of the plural operation keys is controlled to set a standby state, which causes processing to wait until a user makes a selection instruction to select and execute the processing corresponding to at least one of the plural operation keys. If the selection instruction is accepted, execution of the processing selected in response to the selective instruction is controlled.

Even if a user multiply presses plural operation keys to execute processing corresponding to an unintended operation key by mistake, the user can make a selection instruction to select and execute desired action from among processing corresponding to the plural multiply-pressed operation keys. Thus, the user can cancel execution of unintended processing corresponding to the plural multiply-pressed operation keys and execute processing corresponding to an intended operation key instead without needing to return to a previous operation screen and repress the intended operation key. Hence, wasteful operations of the user can be eliminated to increase user convenience.

In addition, where it is uncertain which operation key corresponds to intended processing, if a user has a guess at a target operation key and the multiply pressed plural operation keys includes the operation key, processings corresponding to the plural operation keys are executed in time order.

By confirming the intended processing through multiple key press and subsequently making a selection instruction to select and execute the intended processing, the intended processing can be executed without requiring a user to return to a previous operation screen and press another operation key instead. Hence, at the time of confirming and executing intended processing, wasteful operations of a user can be eliminated.

DETAILED DESCRIPTION

Figure 1:
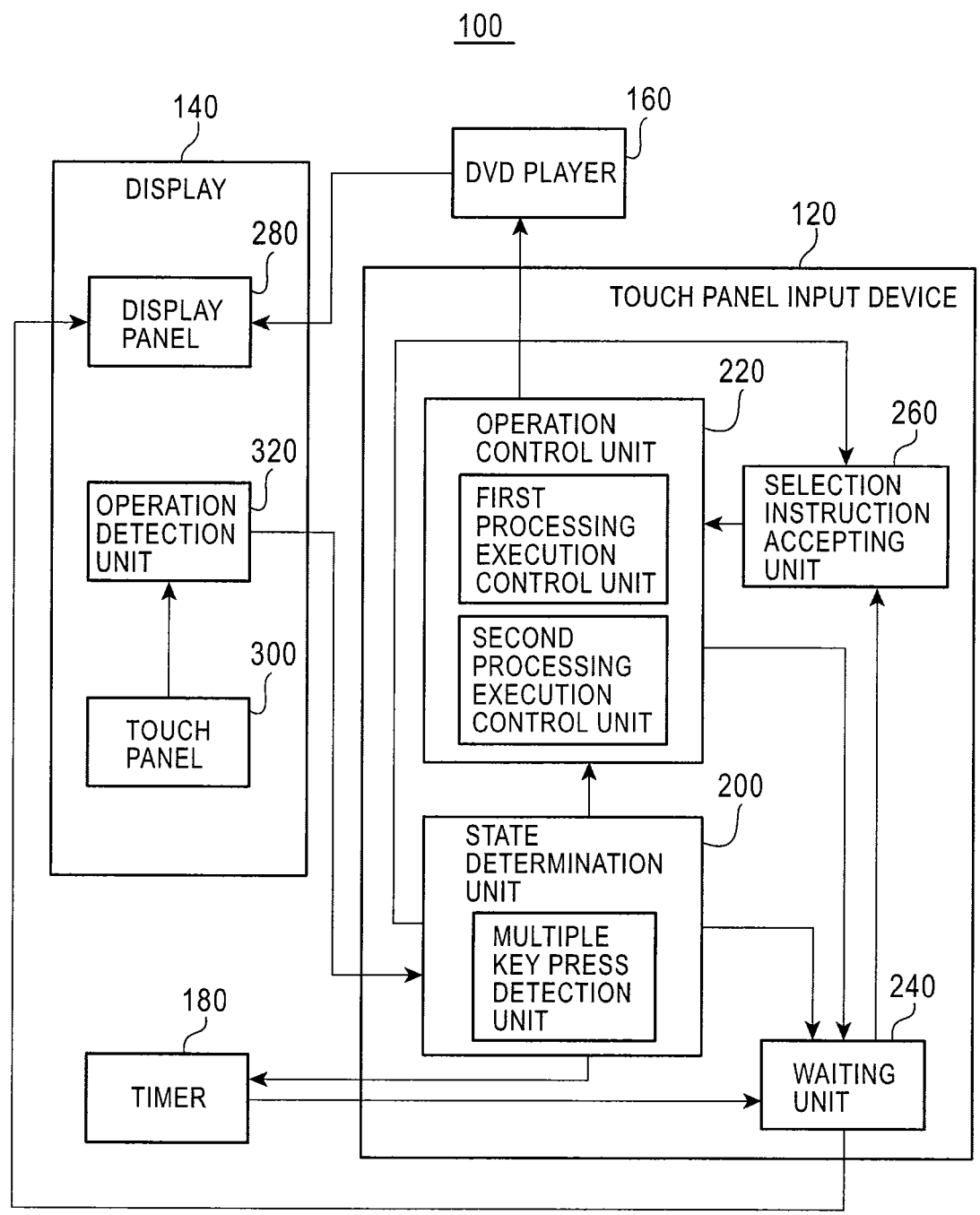
FIG. 1 is a block diagram of a touch panel input device according to a first embodiment of the present invention.

FIG. 1 is a block diagram of a DVD playback system 100 including a touch panel input device 120 of the first embodiment. The DVD playback system 100 includes the touch panel input device 120, a display 140, a DVD player 160, and a timer 180. Further, the touch panel input device 120 includes a state determination unit 200, an operation control unit 220, a waiting unit 240, and a selection instruction accepting unit 260. The display 140 includes a display panel 280, a touch panel 300, and an operation detection unit 320.

The DVD player 160 generates an operation menu including a plurality of operation keys or DVD playback images. The thumbnail images are used by the user to select which chapter he would like to reproduce. The thumbnail images or DVD playback images are used as applications of the DVD playback system 100, which then displays the generated images on the display panel 280. Further, the display panel 280 displays the operation menu and the DVD playback image generated by the DVD player 160.

The touch panel 300 accepts a user's operation on an operation key in the operation menu or an icon. Further, when a user presses an arbitrary position on the touch panel 300, the operation detection unit 320 specifies the press position on the touch panel 300, and then outputs press position information to the state determination unit 200.

Further, if a user presses any position on the touch panel 300 corresponding to an operation key (thumbnail image), the state determination unit 200 outputs to the operation control unit 220, operation key information corresponding to the press position information. Here, the state determination unit 200 includes a table (not shown), which defines a correspondence relationship between the press position information and the operation key information.

Further, the state determination unit 200 has a function of detecting a multiple key press. The state determination unit 200 determines whether multiple keys on the touch panel 300 were pressed based on the press position information received from the operation detection unit 320. For example, if the state determination unit 200 receives multiple press position information from the operation detection unit 320 at almost the same time (or separated by a predetermined amount of time, for example, 50 milliseconds), the state determination unit 200 determines that multiple key were pressed. Further, if the state determination unit 200 does not receive multiple press position information from the operation detection unit 320 at almost the same time (in other words, receives only single press position information), the state determination unit 200 determines that multiple keys were not pressed.

If it is determined that multiple key press were pressed, the state determination unit 200 sends multiple key press information to the timer 180. Moreover, the state determination unit 200 sends plural operation key information to the operation control unit 220 and to the waiting unit 240.

Further, if a user presses any position on the touch panel corresponding to an icon displayed on the display panel 280 by the waiting unit 240, the state determination unit 200 receives press position information about the press position, and sends operation key information corresponding to the selection instruction accepting unit 260.

Here, the state determination unit 200 saves multiple key press detection information indicating that a multiple key press was detected so as to determine whether a user-touched position on the touch panel 300 corresponds to an operation key (thumbnail image).

The timer 180 measures an elapsed time from when multiple key press notifying information was input from the state determination unit 200, and sends elapsed time information to the waiting unit 240. The time at which the timer 180 received multiple key press notifying information from the state determination unit 200 is defined as "time point at which multiple key press was detected".

The operation control unit 220 functions as a first processing execution control unit and a second processing execution control unit. The operation control unit 220 receives operation key information from the state determination unit 200, and sends to the DVD player 160, an operation signal that prompts the DVD player to execute processing specified by the received operation key information. Here, the operation control unit 220 includes a table (not shown) which defines a correspondence relationship between the operation key information and the operation signal for controlling the DVD player 160.

Further, if the operation control unit 220 receives plural operation key information (in other words, if a multiple key press is detected) from the state determination unit 200, the first processing execution control unit selects one of the plural operation key information, and sends to the DVD player 160, an operation signal that prompts the DVD player to execute video playback processing corresponding to the selected operation key information. In addition, the first processing execution control unit sends execution operation key information that represents a selected operation key to the waiting unit 240.

If plural operation key information is received from the state determination unit 200, a desired key is selected as follows. For example, the first processing execution control unit references a priority table (not shown) that defines the priority order of selection for the plural operation key information, and selects the top-priority operation key information from among the plural operation key information. The operation control unit 220 has a priority table.

Further, the operation control unit 220 receives selected-operation-key information from the selection instruction accepting unit 260 as described below. If the selected-operation-key information is received, the first processing execution control unit sends a control signal for stopping the current video playback processing to the DVD player 160. Further, the second processing execution control unit sends to the DVD player 160, an operation signal that prompts the DVD player to execute video playback processing corresponding to an operation key specified by the selected-operation-key information.

The waiting unit 240 receives plural operation key information from the state determination unit 200. In addition, the waiting unit 240 receives execution operation key information from the operation control unit 220. Further, the waiting unit 240 receives elapsed time information from the timer 180. If plural operation key information is received from the state determination unit 200, the waiting unit 240 sets a standby state for waiting until a user makes a selection instruction to select and execute video playback processing corresponding to at least one of the plural operation key information received from the state determination unit 200, other than the execution operation key information and only for a predetermined time (for example, 2 seconds) from when multiple key press was detected. At least one operation key is held in a standby state and is referred to as "standby operation key".

For example, if two operation key information is received from the state determination unit 200 (indicating that two operation keys were multiply pressed), the waiting unit 240 sets a state that waits for a user to make a selection instruction to select and execute video playback processing corresponding to one operation key that is different from an operation key specified by the execution operation key information, out of two operation keys specified by the two operation key information.

Further, if receiving three operation key information from the state determination unit 200 (in other words, three operation keys were multiply pressed), the waiting unit 240 sets a state that waits for a user to make a selection instruction to select and execute two video playback processings corresponding to two operation key, that are different from an operation key specified by execution operation key information received from the operation control unit 220, due to three operation keys specified by the three operation key information.

Further, in the case of setting a standby state, the waiting unit 240 prepares an icon for prompting a user to select and execute video playback processing corresponding to a standby operation key, and displays the icon on the display panel 280. For example, if two operation key information is received from the state determination unit 200, the waiting unit 240 prepares an icon for prompting a user to select and execute video playback processing corresponding to one standby operation key, which is different from an operation key specified by execution operation key information received from the operation control unit 220, due to two operation keys multiply pressed. The icon is then displayed on the display panel 280.

In addition, if three operation key information is received from the state determination unit 200, the waiting unit 240 prepares two icons for prompting a user to select and execute video playback processings corresponding to two standby operation keys, which are different from an operation key specified by the execution operation key information, based on three operation keys multiply pressed. The icons are then displayed on the display panel 280. At this time, the waiting unit 240 may either display the two prepared icons (in other words, set such a state that waits for a user to make a selection to select and execute video playback processings corresponding to two standby operation keys at the same timing) or may display the two icons at predetermined periods (in other words, set such a state that waits for a user to sequentially select and execute video playback processings corresponding to two standby operation keys at different times).

Further, if a predetermined time has elapsed from when multiple key press was detected without any user's operation for pressing an icon, the waiting unit 240 cancels the standby state and hides the icon.

Further, upon setting a standby state, the waiting unit 240 outputs standby operation key information regarding at least one standby operation key to the selection instruction accepting unit 260. For example, if two operation key information are received from the state determination unit 200, the waiting unit 240 outputs standby operation key information regarding one standby operation key to the selection instruction accepting unit 260.

Further, if three operation key information is received from the state determination unit 200, the waiting unit 240 outputs standby operation key information regarding two standby operation keys to the selection instruction accepting unit 260. At this time, in the case of displaying two prepared icons are displayed at the same time, two standby operation key information regarding the two standby operation keys are output to the selection instruction accepting unit 260 at a time. On the other hand, in the case of sequentially displaying the two prepared icons at predetermined periods, the waiting unit 240 outputs two standby operation key information regarding the two standby operation keys in sequence with a predetermined display time set for each icon.

The selection instruction accepting unit 260 receives standby operation key information from the waiting unit 240, and accepts a user input of a selection instruction to select and execute video playback processing corresponding to a standby operation key specified by the received standby operation key information. If a user presses an icon that is displayed on the display panel 280 by the waiting unit 240, the selection instruction accepting unit 260 accepts a selection instruction so as to select and execute video playback processing corresponding to a standby operation key of the pressed icon.

To elaborate, if a user presses a portion of the touch panel 300 corresponding to an icon displayed on the display panel 280 with the waiting unit 240, the operation detection unit 320 sends press position information about the press position on the touch panel 300 to the state determination unit 200. If it is determined that a user pressed a portion of the touch panel 300 corresponding to a position of the icon based on whether multiple key press detection information has been stored, the state determination unit 200 sends operation key information corresponding to the press position information to the selection instruction accepting unit 260. If the operation key information is received from the state determination unit 200, the selection instruction accepting unit 260 accepts a selection instruction to select and execute video playback processing corresponding to an operation key specified by the received operation key information.

Further, the selection instruction accepting unit 260 sends selected-operation-key information regarding an operation key specified by the operation key information received from the state determination unit 200 to the operation control unit 220. If the operation control unit 220 receives the selected-operation-key information, the first processing execution control unit outputs a control signal for stopping the current video playback processing to the DVD player 160. Further, the second processing execution control unit sends to the DVD player 160, an operation signal that prompts the DVD player to execute video playback processing corresponding to an operation key specified by the selected-operation-key information.

Figure 2:
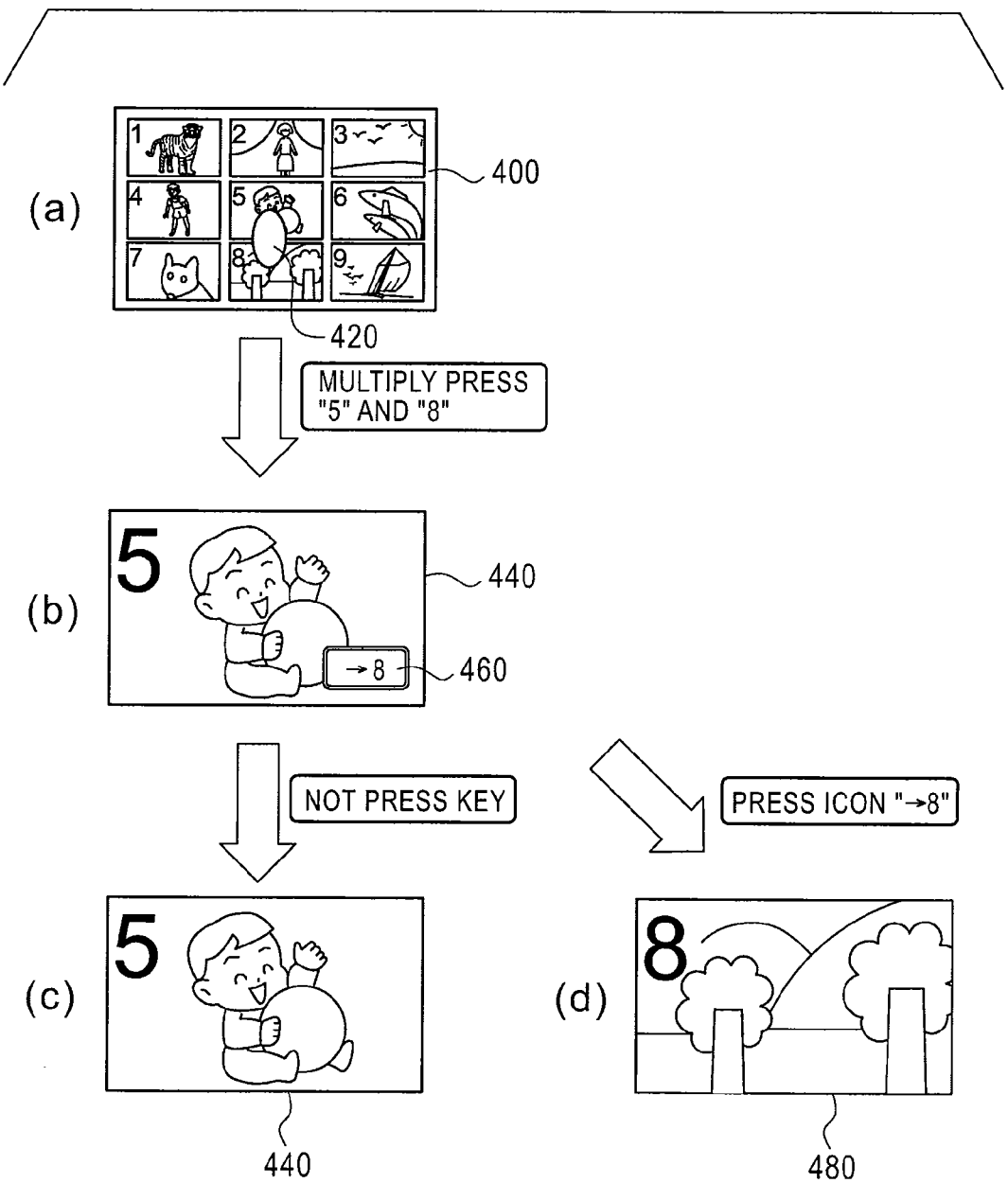
FIG. 2 shows a touch panel screen displayed on a display panel according to the first embodiment.

Next, operation of the touch panel input device 120 of the first embodiment will be described. FIGS. 2(a) to 2(d) show an example of a touch panel screen displayed on the display panel 280 of the touch panel input device 120. In FIG. 2(a), a touch panel screen 400 displays 9 thumbnail images (operation keys) that prompt a user to select which chapter to reproduce and execute video playback processing. The user presses an arbitrary position in an area assigned to any one operation key to execute video playback processing of an intended chapter.

Consider that a user multiply presses two operation keys corresponding to "chapter 5" and "chapter 8" by mistake (see user's finger 420). In this case, the state determination unit 200 sends two operation key information regarding the two operation keys corresponding to "chapter 5" and "chapter 8" to the operation control unit 220. The first processing execution control unit of the operation control unit 220 chooses an operation key of a higher priority from the two operation keys specified, and sends to the DVD player 160, an operation signal that prompts the DVD player to execute video playback processing of a chapter corresponding to the chosen operation key.

In the example of FIG. 2(d), the operation control unit 220 outputs an operation signal that prompts the DVD player 160 to execute video playback processing of "chapter 5" based on the aforementioned priority table. The DVD player 160 receives the operation signal from the operation control unit 220, and generates a DVD playback image of "chapter 5" to display the generated image on the display panel 280.

If a user multiply presses operation keys as shown in FIG. 2(a), the state determination unit 200 sends two operation key information regarding the two operation keys corresponding to "chapter 5" and "chapter 8," to the waiting unit 240. Further, the operation control unit 220 sends execution operation key information representing an operation key corresponding to "chapter 5" selected with the first processing execution control unit, to the waiting unit 240. In response thereto, the waiting unit 240 sets such a state that waits for a user to make a selection instruction to select and execute video playback processing corresponding to an operation key for "chapter 8".

As shown in FIG. 2(d), the waiting unit displays an icon 460 that prompts a user to select and execute video playback processing corresponding to the operation key corresponding to "chapter 8", on the touch panel screen 440. In addition, the waiting unit 240 sends standby operation key information representing the operation key corresponding to "chapter 8" to the selection instruction accepting unit 260.

If a predetermined time (2 seconds) has elapsed from when the two operation keys corresponding to "chapter 5" and "chapter 8" were multiply pressed without any user's operation for pressing the icon 460 displayed on the touch panel screen 440, the waiting unit 240 hides the icon 460 displayed on the touch panel screen 440 and cancels the standby state that was set for the video playback processing corresponding to the operation key for "chapter 8".

As shown in FIG. 2(c), the icon 460 displayed on the touch panel screen 440 is hidden (the standby state set by the waiting unit 240 is cancelled). Then, the waiting unit 240 notifies the selection instruction accepting unit 260 that the standby state for the video playback processing corresponding to the operation key corresponding to "chapter 8" was cancelled.

If a user presses the icon 460 within a predetermined time from when the two operation keys corresponding to "chapter 5" and "chapter 8" were multiply pressed, the selection instruction accepting unit 260 sends selected-operation-key information representing the operation key corresponding to "chapter 8" to the operation control unit 220.

In response thereto, the first processing execution control unit of the operation control unit 220 outputs an operation signal for stopping video playback processing of "chapter 5" to the DVD player 160. Further, the second processing execution control unit sends to the DVD player 160, an operation signal that prompts the DVD player to execute video playback processing of "chapter 8." As a result, the DVD player 160 generates a DVD playback image of "chapter 8" and displays the image on the display panel 280. As shown in FIG. 2(d), images of "chapter 8" are reproduced instead of "chapter 5".

Figure 3:
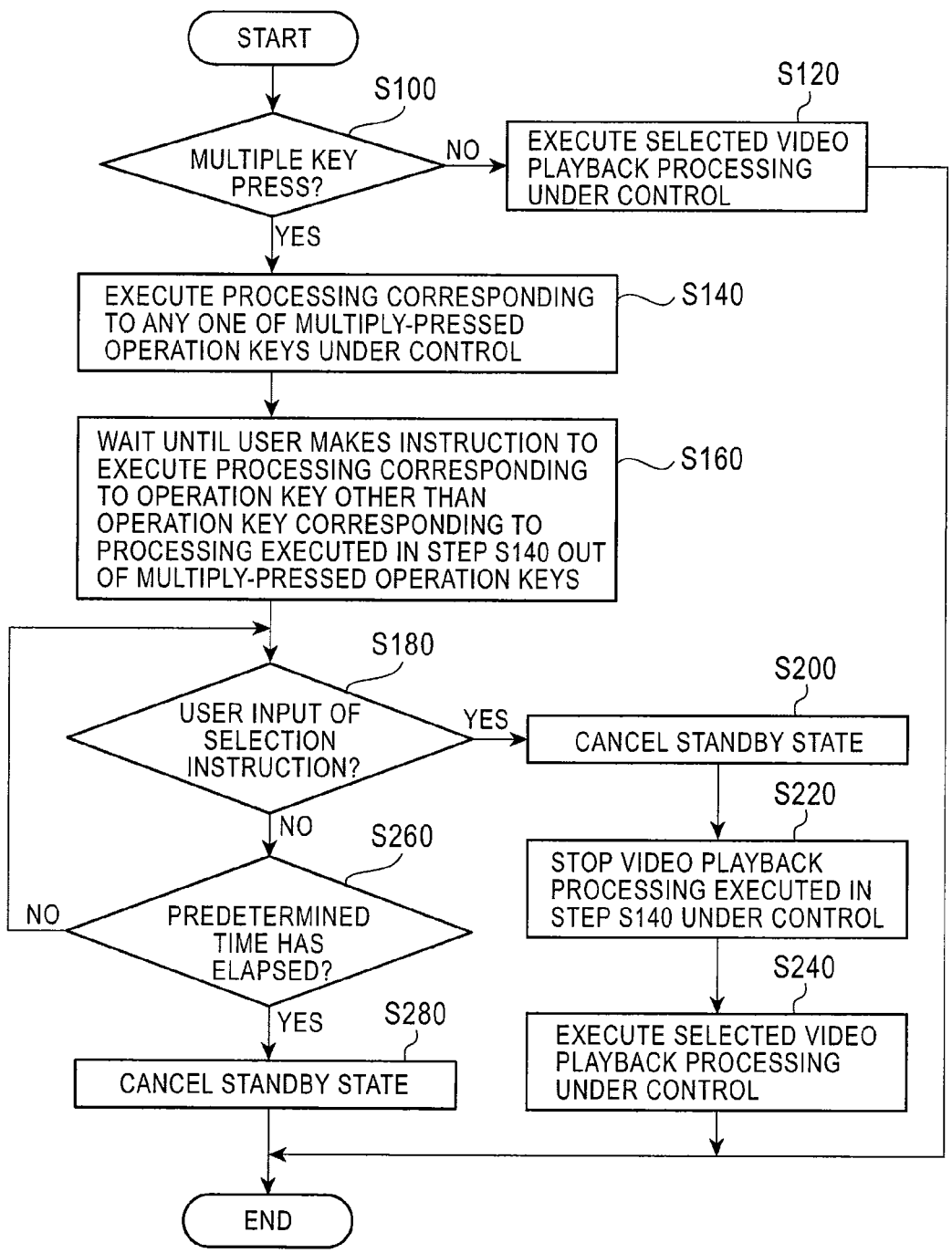
FIG. 3 is a flowchart showing an operation of the touch panel input device according to the first embodiment.

Next, operations of the touch panel input device 120 of the first embodiment will be described. FIG. 3 is a flowchart showing an operational example of the touch panel input device 120 of the first embodiment. If a user presses an arbitrary position in an area assigned to each operation key (thumbnail image) on the touch panel 300, processing in step S100 is started by the state determination unit 200, which receives press position information from the operation detection unit 320.

First, the state determination unit 200 determines whether a multiple key press occurred (step S100). If the state determination unit 200 determines that no multiple key press was applied to the touch panel 300 (NO in step S100), the state determination unit 200 sends operation key information corresponding to the press position information to the operation control unit 220. The operation control unit 220 sends to the DVD player 160, an operation signal that prompts the DVD player to execute video playback processing of a chapter corresponding to operation key specified (step S120). After the completion of the processing in step S120, the processing of the touch panel input device 120 is terminated.

If the state determination unit 200 determines that a multiple key press occurred on the touch panel 300 (YES in step S100), the state determination unit 200 outputs plural operation key information to the operation control unit 220. In response thereto, the first processing execution control unit selects any one of plural multiply-pressed operation keys, and sends to the DVD player 160, an operation signal that prompts the DVD player to execute video playback processing of a chapter corresponding to the selected operation key (step S140).

Next, the waiting unit 240 sets a standby state for waiting until a user makes a selection instruction to select and execute video playback processing of a chapter corresponding to any operation key, other than the operation key selected by the operation control unit 220 in step S140. For example, if two operation key information is received, the waiting unit 240 sets such a state that waits for a user to make a selection instruction to execute video playback processing corresponding to one operation key, which is different from an operation key specified by execution operation key information received from the operation control unit 220.

Next, the operation control unit 220 determines whether the selection instruction accepting unit 260 accepted a user's selection instruction to select and execute video playback processing of a chapter corresponding to the standby operation key (step S180). If the operation control unit 220 determines that the user's selection instruction was accepted (YES in step S180), the waiting unit 240 cancels the standby state (step S200). Next, the first processing execution control unit sends a control signal for stopping the video playback processing executed in step S140 to the DVD player 160 (step S220). The operation control unit 220 then sends to the DVD player 160, an operation signal that prompts the DVD player to execute the video playback processing selected in step S180 (step S240). After the completion of the processing in step S240, the processing of the touch panel input device 120 is terminated.

If the operation control unit 220 determines that the selection instruction accepting unit 260 accepts no user's selection instruction (NO in step S180), the waiting unit 240 references the elapsed time information received from the timer 180 to determine whether a predetermined amount of time (for example, 2 seconds) has elapsed. If the predetermined amount of time has not elapsed (NO in step S260), the processing returns to step S180.

If the waiting unit 240 determines that a predetermined time has elapsed from when the multiple key press was detected (YES in step S260), the waiting unit 240 cancels the standby state set in step S160 (step S280). After the completion of processing in step S280, the processing of the touch panel input device 120 is terminated.

As described in the first embodiment, if plural operation keys were multiply pressed, execution of video playback processing corresponding to any one of the plural operation keys is controlled, and the icon 460 is displayed to prompt a user to make a selection to execute video playback processing corresponding to any other operation key, and then wait for a user to press the icon 460. After that, if the icon 460 is pressed, the current processing is switched to video playback processing corresponding to the pressed icon 460.

Thus, even if a user multiply presses plural operation keys and then video playback processing corresponding to an unintended operation key is executed by mistake, the user can cause execution of video playback processing corresponding to any other operation key out of the multiply-pressed operation keys, by pressing the icon 460, following the multiple key press. Therefore, the user can cancel execution of the unintended video playback processing and execute video playback processing corresponding to the intended operation key instead without bothering to return to a previous operation screen and repress the intended operation key. As a result, wasteful operations of the user can be eliminated so as to increase user convenience.

Further, according to the first embodiment, a standby state is set only for a predetermined amount time (2 seconds) from when multiple key press was detected. Therefore, even if a multiple key press was detected, insofar as images of an intended chapter are reproduced, a user does not need to perform any operation. In this case, after the elapse of the predetermined time, the icon 460 is hidden. Thus, it is possible to avoid the unnecessary display of the icon 460.

The first embodiment describes the case where the operation control unit 220 references the priority table to select the top-priority icon. However, the selection of one operation key can be made based on any other criterion. For example, if the operation detection unit 320 detects an area of a user-pressed portion at each operation key, the operation control unit 220 may receive area information about the area of the pressed portion from the operation detection unit 320, and may utilize this information to help select an operation key corresponding to the largest area pressed.

Further, if the operation detection unit 320 detects a user's pressing force at each operation key, the operation control unit 220 may receive pressing force information about the pressing force, and may utilize this information to help select an operation key corresponding to a pressed portion having the largest pressing force. Further, if the operation detection unit 320 detects a time at which a user presses an operation key at each operation key, the operation control unit 220 may receive timing information about the timing, and may utilize this information to help select an operation key corresponding to a pressed portion that was pressed at an earliest time.

Further, the first embodiment describes the case where the waiting unit 240 displays the icon 460 on the display panel 280 to set a standby state. However, the standby state can be set in other ways. For example, instead of displaying the icon 460 on the display panel 280, a selection instruction may be accepted when an arbitrary position in an acceptance area set in the touch panel 300 is pressed. The acceptance area corresponding to the entire touch panel screen 440 in the illustrated example of FIGS. 2(a) to 2(d). In addition, if an operation menu including "fast-forward key" and "fast-reverse key" is also displayed on the touch panel screen, the acceptance area is set as the entire screen area, except for the portion including the operation menu.

Further, the first embodiment describes the case where the waiting unit 240 sets a standby state only for a predetermined time from when the state determination unit 180 detected multiple key press. However, the waiting unit 240 may set a standby state without limiting a period from when the state determination unit 180 detected multiple key press. This operation is particularly effective for the case of setting an acceptance area with an icon being hidden.

Further, the first embodiment describes the case where an intended operation key on the operation screen is pressed to replay a chapter of a movie recorded on a DVD. However, an intended operation key on the operation screen may be pressed to thereby reproduce broadcasting data received from a broadcasting station. In some embodiments, a TV tuner is provided in place of or in addition to the DVD player 160. The TV tuner displays plural (for example, 9) moving images or still images (operation keys) that prompt a user to select which broadcasting station to reproduce (operation screen) (multi-window). The user can execute playback processing of broadcasting data by pressing an arbitrary position in an area assigned to any one operation key.

Figure 4:
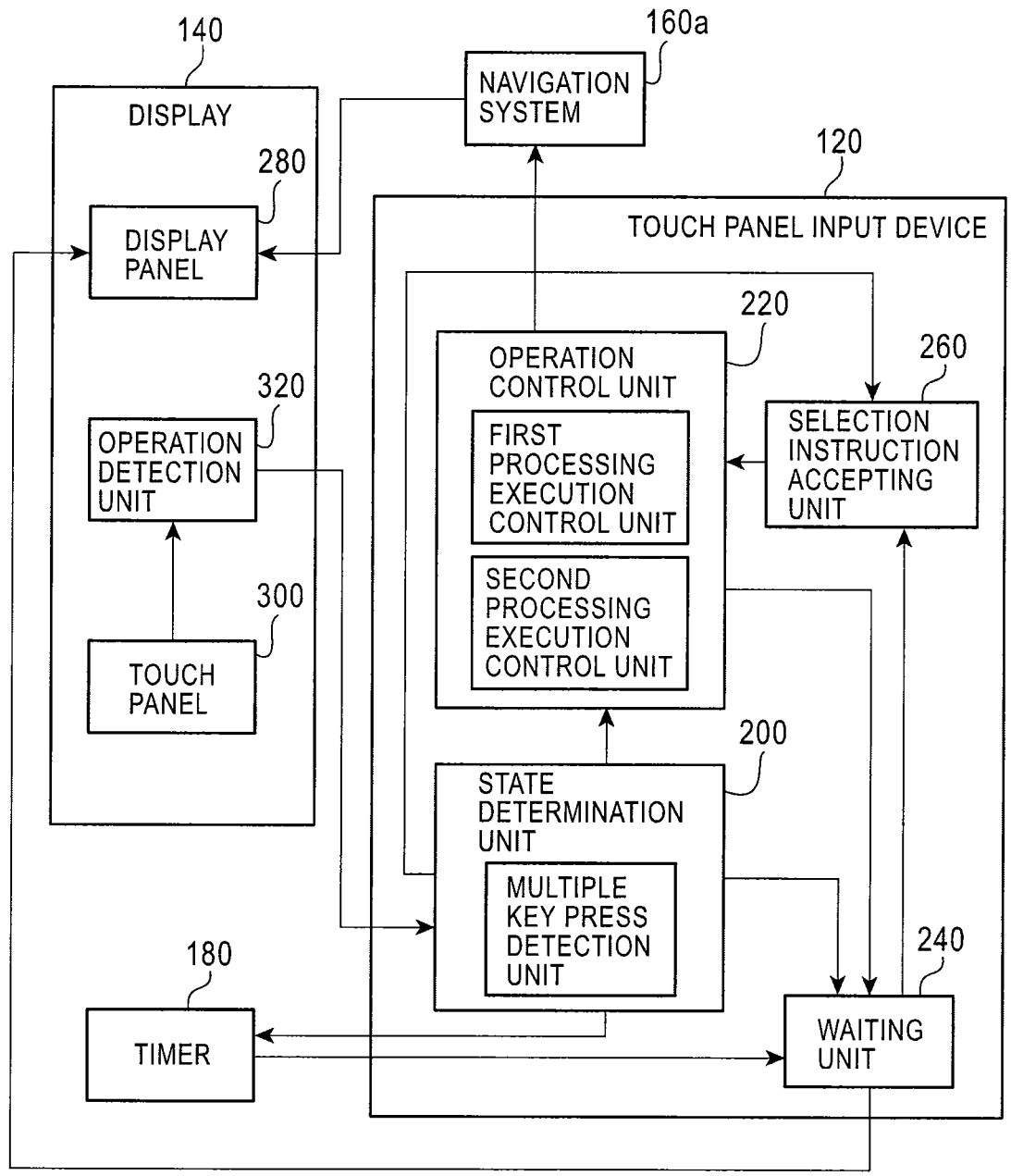
FIG. 4 is a block diagram of a touch panel input device according to a second embodiment of the present invention.

Next, a second embodiment of the present invention will be described. FIG. 4 is a block diagram showing a navigation system 100a, including a touch panel input device 120. In FIG. 4, components given the same reference numerals as those of FIG. 1 have similar function and thus, description thereof is not repeated here. In the second embodiment, a car navigation system 160a is provided in place of the DVD player 160 of FIG. 1.

The car navigation system 160a generates a destination input screen image including plural operation keys (keys that prompt a user to execute input processing of any character), and controls the display of the display panel 280. The display panel 280 displays the destination input screen image generated with the car navigation system 160a.

Figure 5:
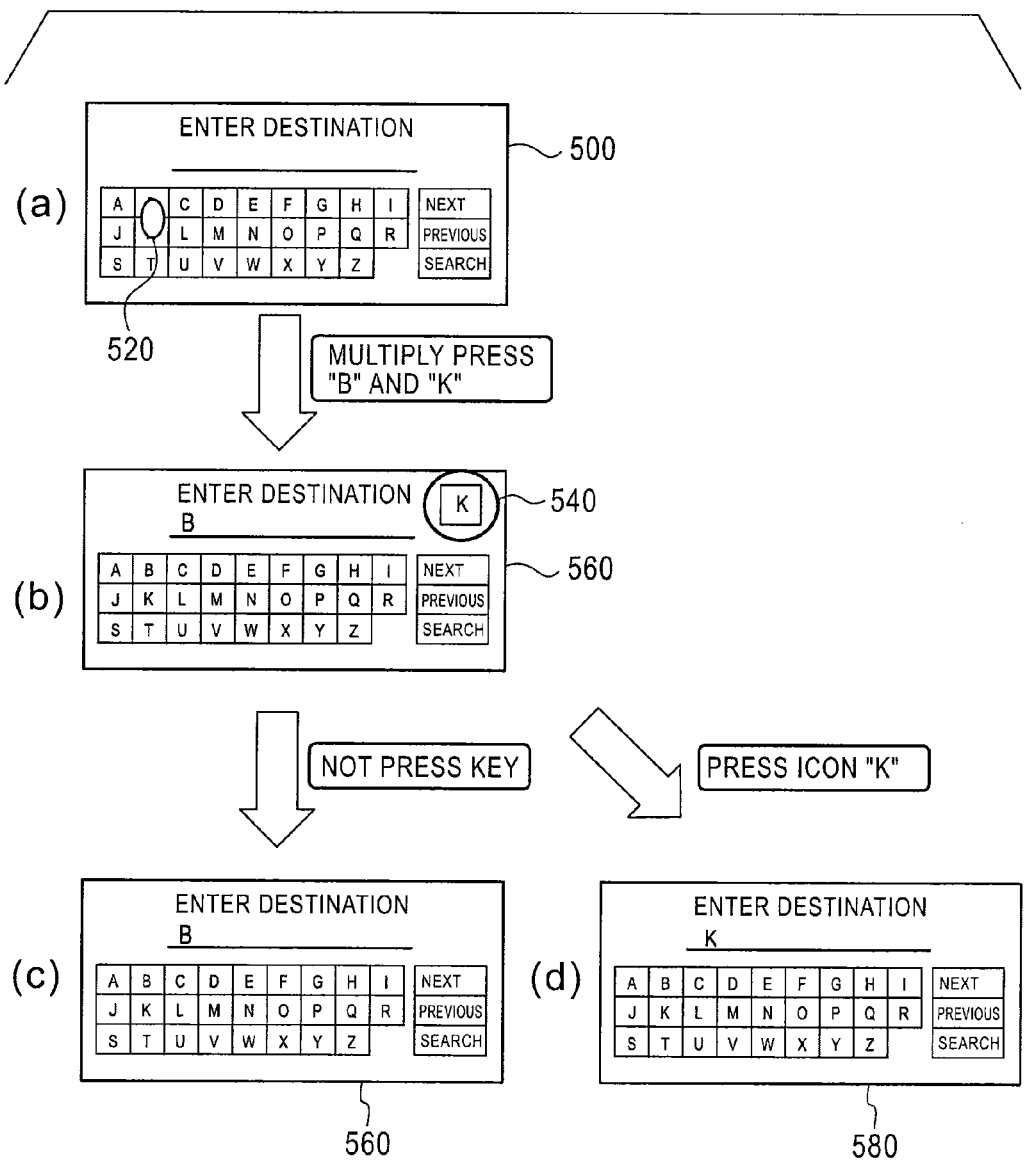
FIG. 5 shows an example of a touch panel screen displayed on a display panel according to the second embodiment.

FIGS. 5(a) to 5(d) show an example of the touch panel screen displayed on the display panel 280 of the touch panel input device 120 of the second embodiment. In FIG. 5(a), a touch panel screen 500 displays operation keys used for designating a destination (alphabetical characters "A" to "Z") upon searching for a route to the destination by means of a route search function of the car navigation system 160a. A user can execute input processing of an intended character by pressing an arbitrary position in an area assigned to any one operation key (character).

If two operation keys corresponding to characters "B" and "K" are multiply pressed by mistake (see a user's finger 520), the state determination unit 200 sends two operation key information representing the two operation keys to the operation control unit 220. The first processing execution control unit selects a higher-priority key of the two operation keys specified, and sends to the car navigation system 160a, an operation signal that prompts the car navigation system to execute character input processing corresponding to the selected operation key.

In the illustrated example of FIG. 5(d), the operation control unit 220 outputs an operation signal that prompts the car navigation system 160a to execute input processing of the character "B" in accordance with the aforementioned priority table. The car navigation system 160a receives the operation signal from the operation control unit 220 to generate a destination input screen image, where the character "B" is input, and then displays the generated image on the display panel 280.

If operation keys were multiply pressed as shown in FIG. 5(a), the state determination unit 200 sends two operation key information representing two operation keys corresponding to the characters "B" and "K" to the waiting unit 240. Further, the operation control unit 220 sends execution operation key information representing an operation key corresponding to the character "B" to the waiting unit 240. In response thereto, the waiting unit 240 sets such a state, which causes processing to wait until a user makes a selection instruction to select and execute character input processing of the character "K" corresponding to the other multiply-pressed key.

As shown in FIG. 5(d), an icon 540 is displayed on the touch panel screen 560 to prompt a user to execute character input processing of the character "K". Further, the waiting unit 240 sends standby operation key information representing an operation key corresponding to the character "K" to the selection instruction accepting unit 260.

If a predetermined amount of time (for example, 2 seconds) has elapsed from when the two operation keys corresponding to the characters "B" and "K" were multiply pressed without a user's operation, the waiting unit 240 hides the icon 540 as well as cancels the standby state. As shown in FIG. 5(c), the icon 540 displayed on the touch panel screen 560 is hidden (standby state set by the waiting unit 240 is cancelled). Then, the waiting unit 240 notifies the selection instruction accepting unit 260 that the standby state set for execution of character input processing corresponding to the operation key corresponding to the character "K", was cancelled.

If a user presses the icon 540 displayed on the touch panel screen 560 (corresponding to the character "K") within a predetermined time from when the two operation keys corresponding to the characters "B" and "K" were multiply pressed, the selection instruction accepting unit 260 sends selected-operation-key information representing the operation key corresponding to the character "K" to the operation control unit 220.

In response thereto, the first processing execution control unit of the operation control unit 220 sends an operation signal for cancelling character input processing of the character "B" toward the car navigation system 160a. Further, the second processing execution control unit sends an operation signal for executing character input processing of the character "K" to the car navigation system 160a. As a result, the car navigation system 160a deletes the character "B," and inputs the character "K" instead, to generate the destination input screen image, and then displays the generated image on the display panel 280. As shown in FIG. 5(d), the destination input screen image includes the character "K" in place of the character "B".

FIGS. 6(a) to 6(d) show another example of the touch panel screen displayed on the display panel 280 of the touch panel input device 120 of the second embodiment. In FIG. 6(a), the touch panel screen 600 displays operation keys ("name", "phone number", and "address") for invoking a desired search menu upon searching for a route to a destination. A user can execute startup processing of an intended search menu by pressing an arbitrary position within an area assigned to any one operation key (search menu).

If a user multiply presses two operation keys corresponding to search menu "name" and "phone number" by mistake (see a user's finger 620), the state determination unit 200 sends two operation key information regarding the two operation keys corresponding to the search menu "name" and "phone number" to the operation control unit 220. The first processing execution control unit selects a higher-priority one of the two operation keys specified, and sends to the car navigation system 160a, an operation signal that prompts the system to execute menu startup processing corresponding to the selected operation key.

In the illustrated example of FIG. 6(d), the operation control unit 220 sends an operation signal that prompts the car navigation system 160a to execute startup processing of the search menu "name" in accordance with the aforementioned priority table. The car navigation system 160a receives the operation signal from the operation control unit 220 to generate a screen image where the search menu "name" is invoked, and then displays the generated image on the display panel 280.

If a user multiply presses operation keys as shown in FIG. 6(a), the state determination unit 200 sends two operation key information representing operation keys corresponding to the search menu "name" and "phone number" to the waiting unit 240. Further, the operation control unit 220 sends execution operation key information representing the operation key corresponding to the search menu "name" to the waiting unit 240. In response thereto, the waiting unit 240 sets such a state that causes processing to wait until a user makes a selection instruction to select and execute menu startup processing of the search menu "phone number". As shown in FIG. 6(d), an icon 640 that prompts a user to execute menu startup processing of the search menu "phone number" is shown on the touch panel screen 660. Further, the waiting unit 240 sends standby operation key information representing an operation key corresponding to the search menu "phone number" to the selection instruction accepting unit 260.

If a predetermined amount of time (for example, 2 seconds) has elapsed from when two operation keys corresponding to the search menu "name" and "phone number" were multiply pressed without a user's operation for pressing the icon 640, the waiting unit 240 hides the icon 640 as well as cancels the standby state. As shown in FIG. 6(c), the icon 640 displayed on the touch panel screen 660 is hidden (standby state set by the waiting unit 240 is cancelled). Then, the waiting unit 240 notifies the selection instruction accepting unit 260 that the standby state set for execution of the menu startup processing of the search menu "phone number" was cancelled.

If a user presses the icon 640 displayed on the touch panel screen 660 (corresponding to the search menu "phone number") within a predetermined time from when the two operation keys corresponding to the search menu "name" and "phone number" were multiply pressed, the selection instruction accepting unit 260 sends selected-operation-key information representing the operation key corresponding to the search menu "phone number," to the operation control unit 220.

Figure 6:
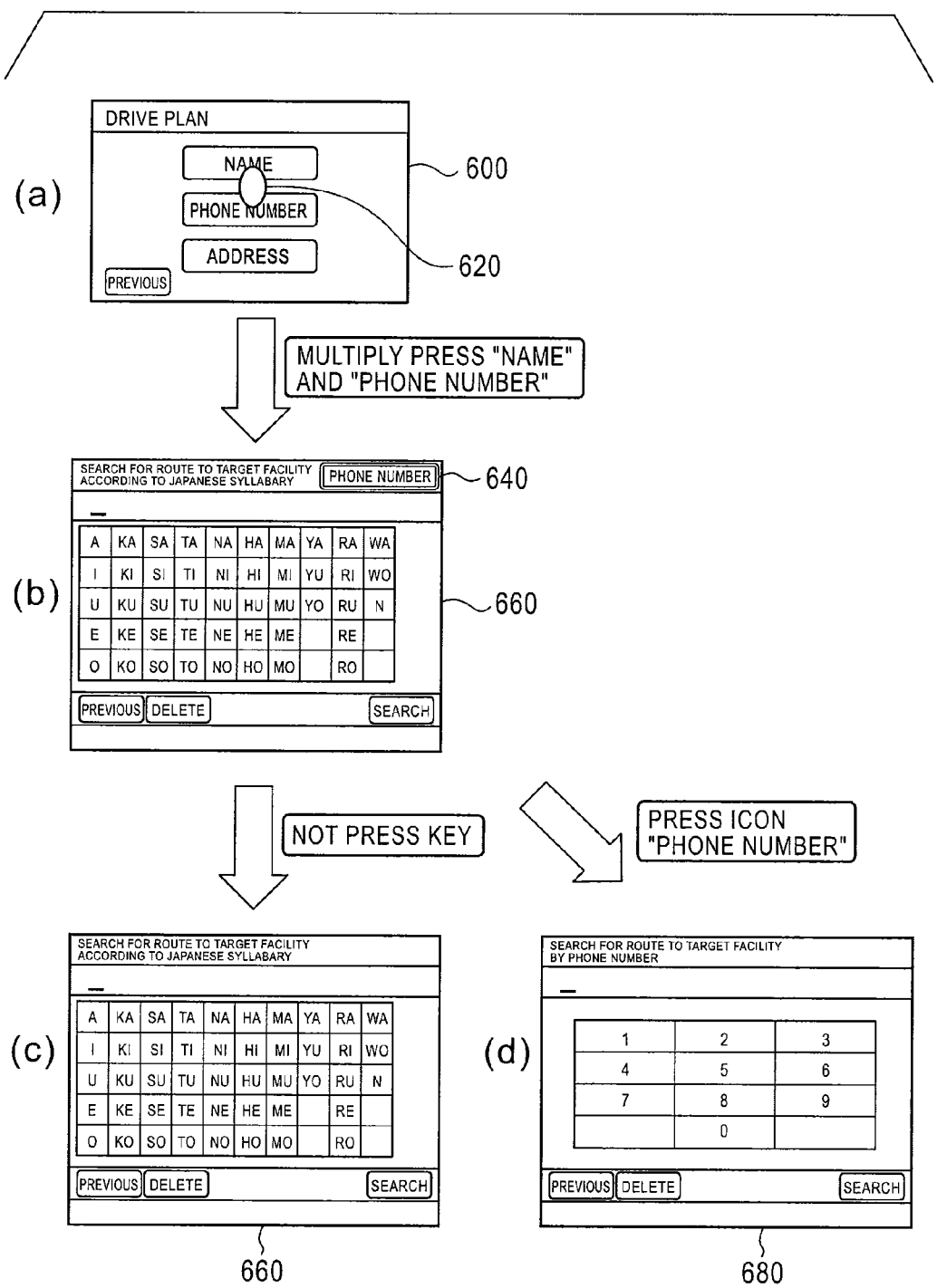
FIG. 6 shows an example of a touch panel screen displayed on a display panel according to the second embodiment.

In response thereto, the first processing execution control unit of the operation control unit 220 sends an operation signal for cancelling the menu startup processing of the search menu "name" to the car navigation system 160*a*. Further, the second processing execution control unit sends an operation signal for executing menu startup processing of the search menu "phone number" to the car navigation system 160*a*. As a result, the car navigation system 160*a* cancels the startup processing for the search menu "name" to generate a screen image where the search menu "phone number" is invoked, and then displays the generated image on the display panel 280. As shown in FIG. 6(*d*), a screen image where the search menu "phone number" appears in place of the search menu "name" is displayed.

As described above in detail, in the second embodiment, even if a user multiply presses plural operation keys and character input processing (or search menu startup processing) corresponding to an unintended operation key is executed by mistake, the user can cancel execution of unintended character input processing (or search menu startup processing) and execute character input processing (or search menu startup processing) corresponding to an intended operation key instead without needing to return to a previous operation screen to press the intended operation key. As a result, wasteful operations of the user can be eliminated to increase user convenience.

Figure 7:
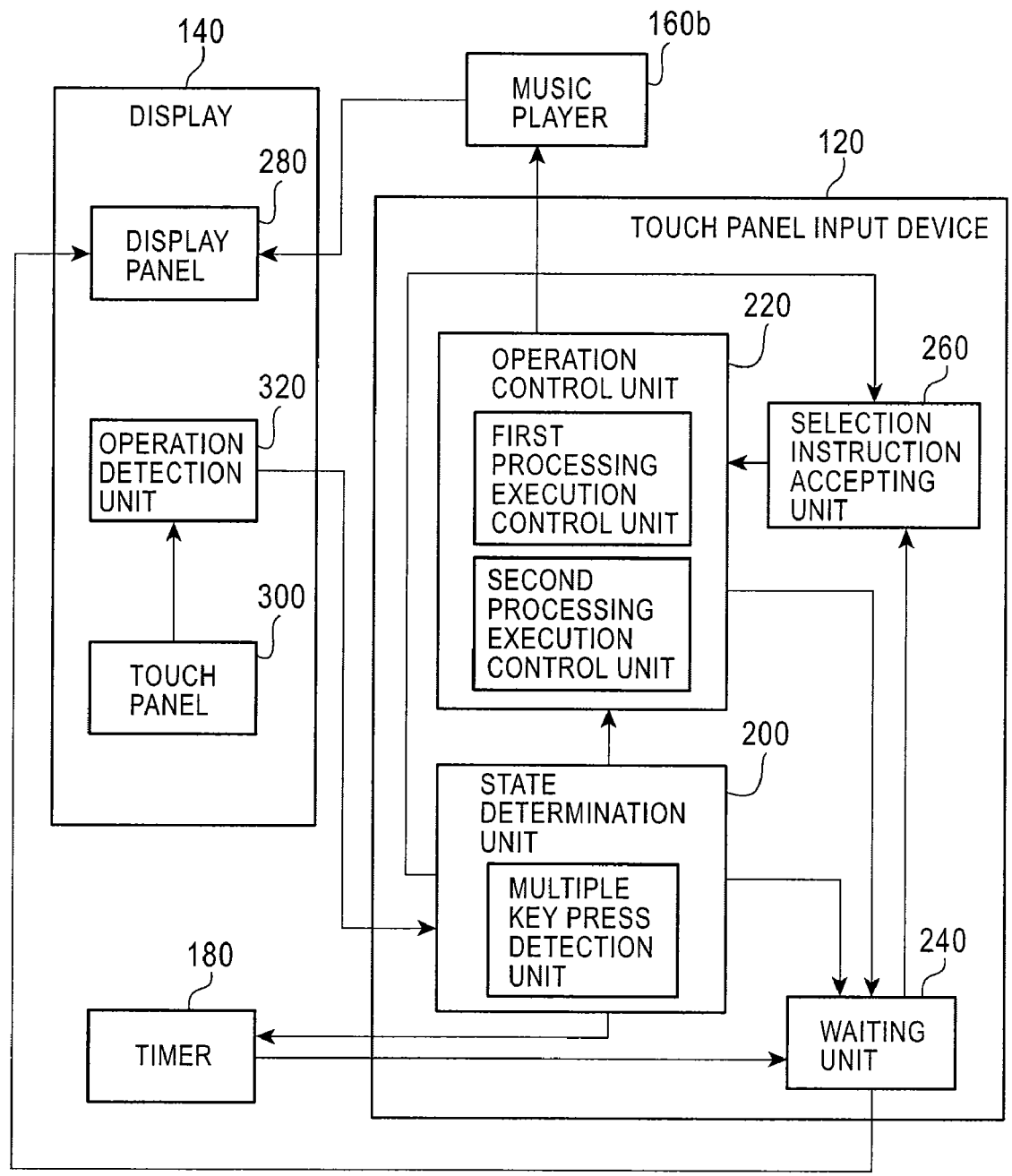
FIG. 7 is a block diagram of a touch panel input device according to a third embodiment of the present invention.

Next, a third embodiment of the present invention will be described. FIG. 7 is a block diagram showing a music playback system 100*b* including the touch panel input device 120. In FIG. 7, components given the same reference numerals as those of FIG. 1 have similar function and thus, description thereof is not repeated here. In the third embodiment, a music player 160*b* is provided in place of the DVD player 160 of FIG. 1.

The music player 160*b* generates a song selection screen image including plural operation keys (keys for selecting one song from the list of plural songs), and controls the display of the display panel 280. Further, the display panel 280 displays the song selection screen image generated with the music player 160*b*.

Figure 8:
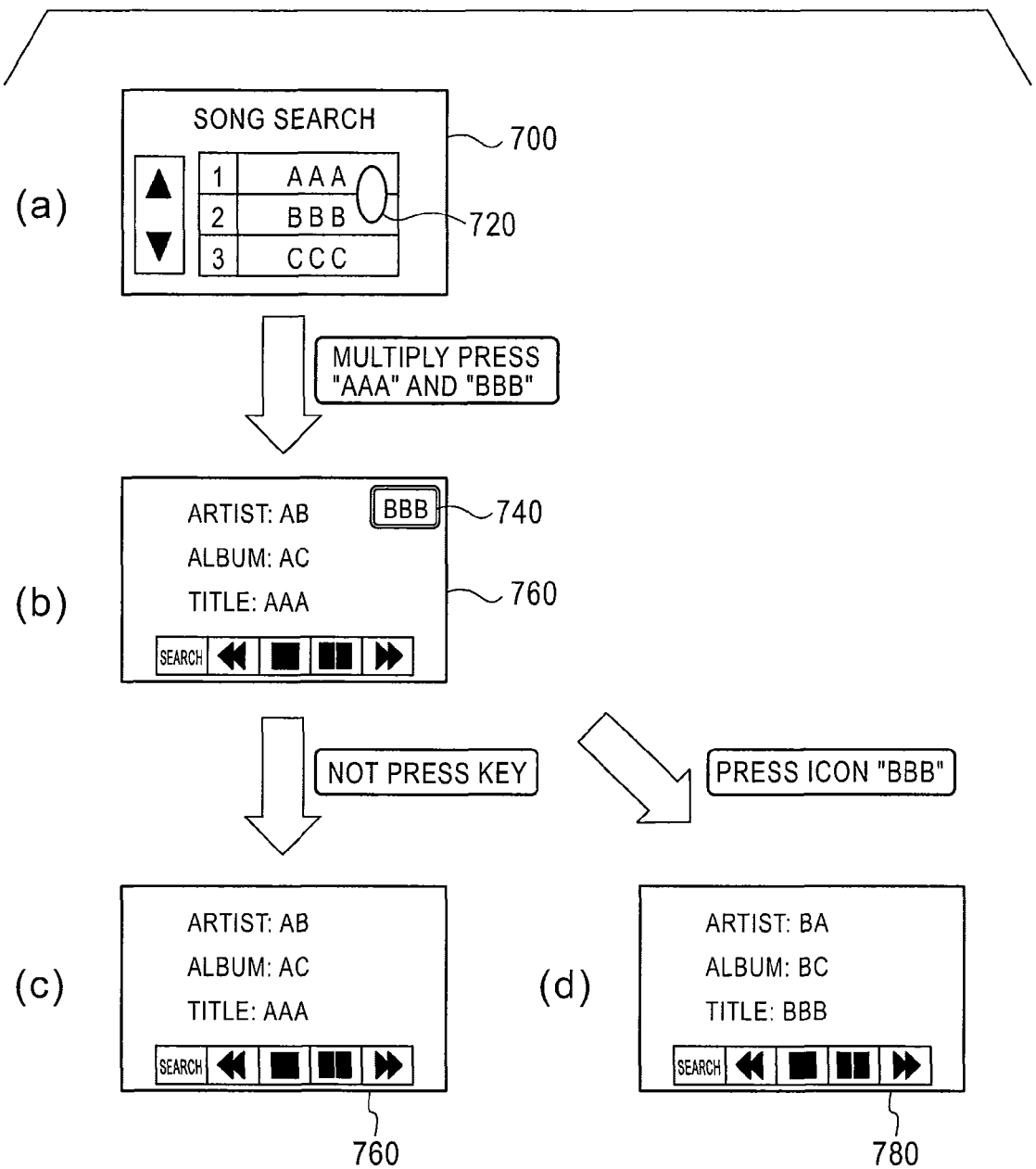
FIG. 8 shows an example of a touch panel screen displayed on a display panel according to the third embodiment.

FIGS. 8(*a*) to 8(*d*) show an example of a touch panel screen displayed on the display panel 280 of the touch panel input device 120 of the third embodiment. In FIG. 8(*a*), a touch panel screen 700 displays operation keys (songs "AAA", "BBB" and "CCC") for selecting one song from plural search results. A user can execute intended music playback processing by pressing an arbitrary position within an area assigned to any one operation key (song).

If a user multiply presses two operation keys corresponding to the songs "AAA" and "BBB" by mistake (see a user's finger 720), the state determination unit 200 sends two operation key information representing two operation keys corresponding to the songs "AAA" and "BBB," to the operation control unit 220. The first processing execution control unit of the operation control unit 220 selects a higher-priority one of the two operation keys specified by the two operation key information, and sends to the music player 160*b*, an operation signal that prompts the music player to execute music playback processing corresponding to the selected operation key.

In the illustrated example of FIG. 8(*d*), the operation control unit 220 outputs an operation signal that prompts the music player 160*b* to execute playback processing of the song "AAA" in accordance with the aforementioned priority table. The music player 160*b* receives the operation signal from the operation control unit 220 to generate a song playback screen image for playing the song "AAA," and then displays the generated image on the display panel 280.

If a user multiply presses operation keys as shown in FIG. 8(*a*), the state determination unit 200 sends two operation key information representing the operation keys corresponding to the songs "AAA" and "BBB" to the waiting unit 240. Further, the operation control unit 220 sends execution operation key information representing the operation key corresponding to the song "AAA" selected with the first processing execution control unit to the waiting unit 240. In response thereto, the waiting unit 240 sets such a state that causes processing to wait until a user makes a selection instruction to select and execute music playback processing corresponding to the other multiply-pressed operation key corresponding to the song "BBB".

As shown in FIG. 8(*d*), an icon 740 is displayed on a touch panel screen 760 to prompt a user to select execution of music playback processing corresponding to the operation key corresponding to the song "BBB". Further, the waiting unit 240 sends standby operation key information representing the operation key corresponding to the song "BBB" to the selection instruction accepting unit 260.

If a predetermined amount of time (for example, 2 seconds) has elapsed from when the two operation keys corresponding to the songs "AAA" and "BBB" were multiply pressed without a user's operation for pressing the icon 740, the waiting unit 240 hides the icon 740 as well as cancels the standby state. As shown in FIG. 8(*c*), the icon 740 displayed on the touch panel screen 760 is hidden (the standby state set by the waiting unit 240 is cancelled). Then, the waiting unit 240 notifies the selection instruction accepting unit 260 that the standby state set for execution of the music playback processing corresponding to the operation key corresponding to the song "BBB" was cancelled.

If a user presses the icon 740 displayed on the touch panel screen 760 (corresponding to the song "BBB") within a predetermined time from when the two operation keys corresponding to the songs "AAA" and "BBB" were multiply pressed, the selection instruction accepting unit 260 sends selected-operation-key information representing the operation key corresponding to the song "BBB" to the operation control unit 220.

In response thereto, the first processing execution control unit of the operation control unit 220 sends an operation signal for cancelling music playback processing of the song "AAA" to the music player 160*b*. Further, the second processing execution control unit sends an operation signal for executing music playback processing of the song "BBB" to the music player 160*b*. Then, the music player 160*b* cancels the playback processing of the song "AAA" to generate a song playback screen image for playing the song "BBB", and displays the generated image on the display panel 280. As shown in FIG. 8(*d*), a song playback screen image for playing the song "BBB" in place of the song "AAA" is displayed on the touch panel screen 780.

As described above in detail, in the third embodiment, even if a user multiply presses plural operation keys to execute music playback processing corresponding to an unintended operation key by mistake, the user can cancel unintended music playback processing and execute music playback processing corresponding to an intended operation key instead without needing to return to a previous operation screen and repress the intended operation key. As a result, wasteful operations of the user can be eliminated.

Figure 9:
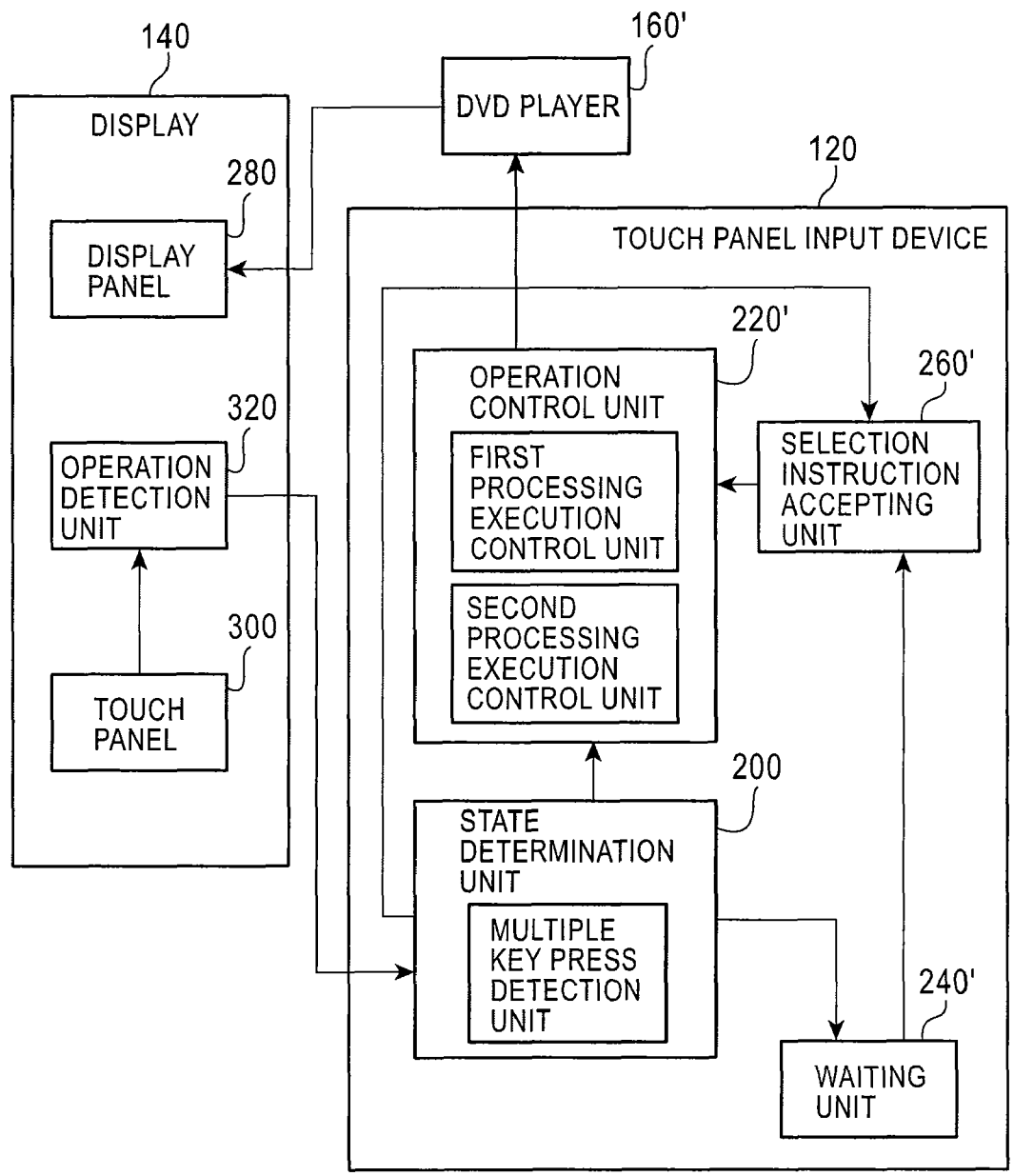
FIG. 9 is a block diagram of a touch panel input device according to a fourth embodiment of the present invention.

Next, a fourth embodiment of the present invention will be described. FIG. 9 is a block diagram showing a DVD playback system 100c including the touch panel input device 120. In FIG. 9, components given the same reference numerals as those of FIG. 1 have similar function and thus, description thereof is not repeated here.

In the fourth embodiment, the DVD playback system 100c is provided with a DVD player 160' in place of the DVD player 160 of FIG. 1. The touch panel input device 120 is provided with an operation control unit 220' in place of the operation control unit 220 of FIG. 1. Further, the touch panel input device 120 is provided with a waiting unit 240' in place of the waiting unit 240 of FIG. 1. Further, the touch panel input device 120 is provided with a selection instruction accepting unit 260' in place of the selection instruction accepting unit 260 of FIG. 1.

If plural operation key information is received from the state determination unit 200 (in other words, multiple key press was applied to the touch panel 300), a first processing execution control unit of the operation control unit 220' sends to the DVD player 160', operation signals that prompt the DVD player to execute video playback processing corresponding to each of plural operation keys specified by the plural operation key information. The DVD player 160' generates plural DVD playback screen images necessary for video playback processing corresponding to each of the plural operation keys, and displays the plural DVD playback screen images on the display panel 280 in a split-screen mode.

Further, when the waiting unit 240' sets a standby state, the operation control unit 220' receives selected-operation-key information from the selection instruction accepting unit 260'. When receiving the selected-operation-key information, the operation control unit 220' sends to the DVD player 160', an operation signal that prompts the DVD player to execute video playback processing corresponding to an operation key specified by the received selected-operation-key information. Here, the operation control unit 220' outputs no-execution operation key information to the waiting unit 240. This is because if plural operation key information is received, the waiting unit 240' waits for a user to make a selection instruction to select and execute video playback processing corresponding to all of plural operation keys specified and thus, does not need to recognize which one of the pressed operation keys triggered the currently-executed processing and which one of the pressed operation keys did not contribute to the currently-executed processing.

If the state determination unit 200 detected multiple key press, the waiting unit 240' receives plural operation key information from the state determination unit 200. When the plural operation key information is received, the waiting unit 240' sets a standby state that causes processing to wait until a user makes a selection instruction to select and execute video playback processing corresponding to plural operation keys specified by the plural operation key information. For example, if two operation key information is received from the state determination unit 200 (in other words, two operation keys were multiply pressed), the waiting unit 240' sets such a state that causes processing to wait until a user makes a selection instruction to select and execute one of video playback processings corresponding to two operation keys specified by the two operation key information. The waiting unit 240' does not display an icon that prompts a user to select and execute video playback processing corresponding to a standby operation key at the time of setting a standby state. Further, the waiting unit 240' sets each of the plural DVD playback screen images displayed in a split-screen mode as an acceptance area.

Further, the waiting unit 240' sends plural operation key information received from the state determination unit 200 as plural standby operation key information to the selection instruction accepting unit 260'. For example, if two operation key information is received from the state determination unit 200, the waiting unit 240' sends standby operation key information representing two multiply-pressed operation keys to the selection instruction accepting unit 260'. Thus, the selection instruction accepting unit 260' can recognize the number of split screen parts. In other words, the selection instruction accepting unit 260' detects that the waiting unit 240' sets as many acceptance areas as the number of split screen parts. Moreover, the selection instruction accepting unit 260' recognizes a correspondence between the acceptance areas and chapters.

For example, if two standby operation key information is received from the waiting unit 240', the selection instruction accepting unit 260' recognizes that acceptance areas of two DVD playback screen images are set as two, with right and left split screen parts, and an acceptance area of a DVD playback screen image corresponding to a chapter given a smaller number, is assigned to the left split screen part. Further, if three standby operation key information is received from the waiting unit 240', the selection instruction accepting unit 260' recognizes that three DVD playback screen images are displayed in three areas, namely left, center, and right split screen parts, and a DVD playback screen image corresponding to a chapter given the smallest number is assigned to the left split screen part. Further, if four standby operation key information is received from the waiting unit 240', the selection instruction accepting unit 260' recognizes that four DVD playback screen images are displayed in a matrix, and acceptance areas of DVD playback screen images corresponding to four chapters are assigned to four split screen parts. In this case, the chapter number increases in the order of the upper left part, the upper right part, the lower left part, and the lower right part.

The selection instruction accepting unit 260' receives plural standby operation key information from the waiting unit 240' and accepts a user's selection instruction to select and execute video playback processing corresponding to plural operation keys specified by the plural standby operation key information. When a user presses any one of plural DVD playback screen images (split screen images) displayed on the display panel 280 in a split screen mode, the selection instruction accepting unit 260' accepts a selection instruction to select and execute video playback processing (full-screen image) of a chapter corresponding to the pressed DVD playback screen image.

If a user presses a portion of the touch panel 300 corresponding to any one of plural DVD playback screen images, the operation detection unit 320 sends press position information about the press position to the state determination unit 200. The state determination unit 200 receives plural press position information from the operation detection unit 320, and sends plural operation key information corresponding to each acceptance area specified by the press position information, to the selection instruction accepting unit 260'. When plural operation key information is received from the state determination unit 200, the selection instruction accepting unit 260' accepts a selection instruction to select and execute video playback processing of chapters corresponding to each of plural operation keys specified by the plural operation key information.

Further, the selection instruction accepting unit 260' sends the operation key information received from the state determination unit 200 as selected-operation-key information to the operation control unit 220'. If the operation control unit 220' received the selected-operation-key information from the selection instruction accepting unit 260', the first processing execution control unit sends to the DVD player 160', an operation signal that prompts the DVD player to stop all of video playback processings being currently executed under the control of the operation control unit 220'. Further, the second processing execution control unit sends to the DVD player 160', an operation signal that prompts the DVD player to execute video playback processing of a chapter corresponding to an operation key specified by the received selected-operation-key information.

Figure 10:
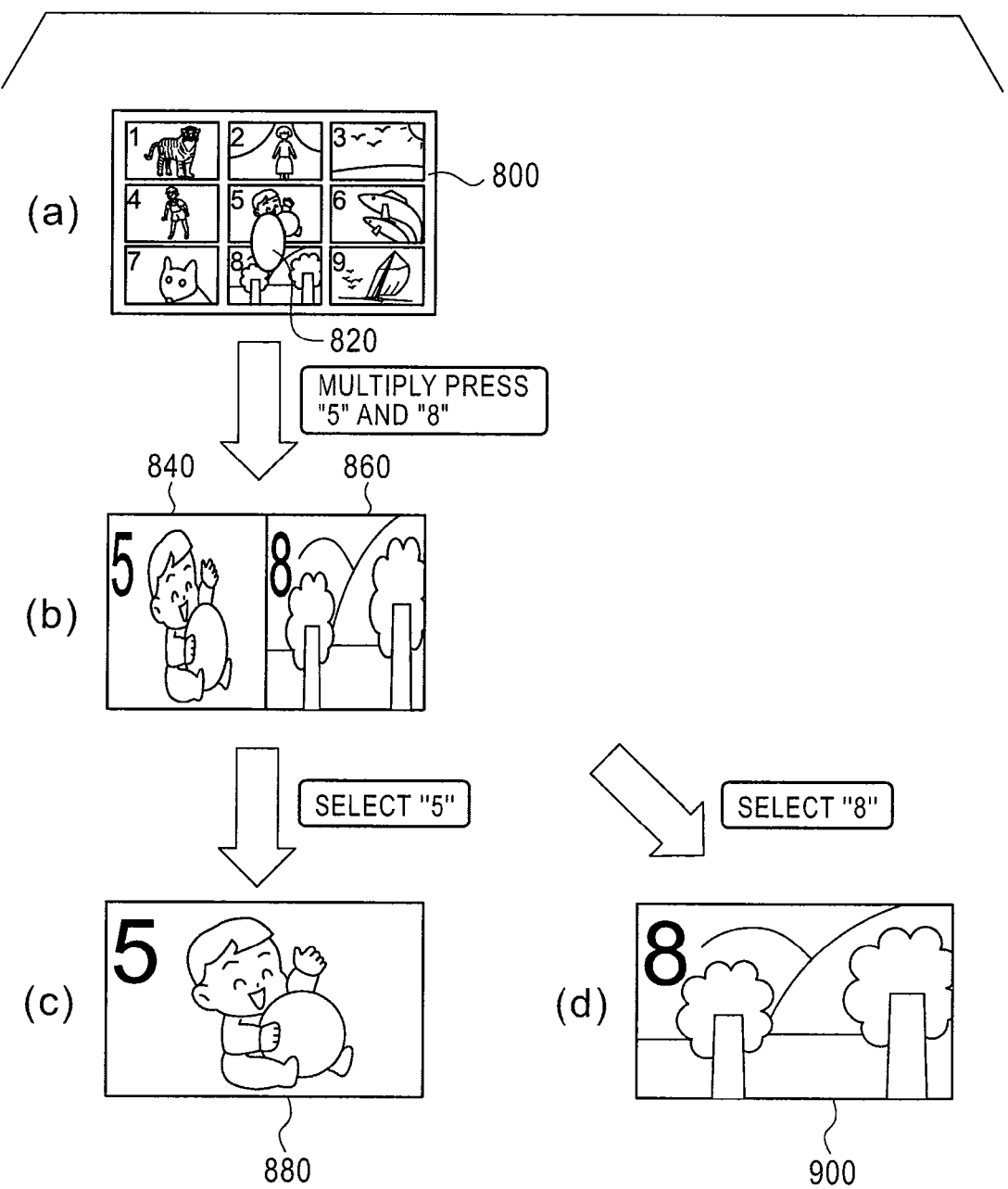
FIG. 10 shows an example of a touch panel screen displayed on a display panel according to the fourth embodiment.

Next, operation of the touch panel input device 120 of the fourth embodiment will be described. FIGS. 10(a) to 10(d) show a touch panel screen displayed on the display panel 280 of the touch panel input device 120. In FIG. 10(a), the touch panel screen 800 displays 9 thumbnail images (operation keys) that prompt a user to execute video playback processing of a desired chapter. The user can execute video playback processing of an intended chapter by pressing an arbitrary position within an area assigned to any one operation key.

If a user intentionally multiply presses two operation keys corresponding to "chapter 5" and "chapter 8" (see a user's finger 820), the state determination unit 200 sends two operation key information representing the two operation keys corresponding to "chapter 5" and "chapter 8" to the operation control unit 220'. The first processing execution control unit of the operation control unit 220' sends to the DVD player 160', an operation signal that prompts the DVD player to execute video playback processing corresponding to the two operation keys specified by the two operation key information received from the state determination unit 200 (in the examples of FIGS. 10(a) to 10(d), video playback processing of "chapter 5" and "chapter 8").

In response to the operation signal from the operation control unit 220', the DVD player 160' generates DVD playback screen images corresponding to "chapter 5" and "chapter 8" as shown in FIG. 10(d), and displays the generated images on the touch panel screen 840 and touch panel screen 860 of the display panel 280.

At this time, the state determination unit 200 sends two operation key information representing the operation keys corresponding to "chapter 5" and "chapter 8" to the waiting unit 240'. In response thereto, the waiting unit 240' waits for a user to make a selection instruction to execute video playback processing corresponding to the operation keys corresponding to "chapter 5" and "chapter 8". Then, the waiting unit 240' sends standby operation key information corresponding to "chapter 5" and "chapter 8" to the selection instruction accepting unit 260'.

Consider that a user presses the DVD playback screen image corresponding to "chapter 5" displayed on the touch panel screen 840 after the standby state was set. In this case, the waiting unit 240' first receives a notification to that effect from the state determination unit 200 and cancels the standby state. Then, the waiting unit 240' notifies the selection instruction accepting unit 260' that the standby state was cancelled.

Next, the selection instruction accepting unit 260' determines that the DVD playback screen image corresponding to "chapter 5" was pressed based on press position information received from the state determination unit 200, and then sends selected-operation-key information representing the operation key corresponding to "chapter 5" to the operation control unit 220'. In response thereto, the first processing execution control unit of the operation control unit 220' sends to the DVD player 160', an operation signal that prompts the DVD player to stop video playback processings corresponding to the operation keys corresponding to "chapter 5" and "chapter 8".

Further, the second processing execution control unit sends to the DVD player 160', an operation signal that prompts the DVD player to execute video playback processing corresponding to the selected operation key corresponding to "chapter 5". The DVD player 160' generates a DVD playback screen image corresponding to "chapter 5" and displays the generated image on the display panel 280 in a full-screen mode, as shown in FIG. 10(c).

On the other hand, consider that a user presses the DVD playback screen image corresponding to "chapter 8" and displayed on the touch panel screen 860, after the standby state was set. In this case, the waiting unit 240' cancels the standby state in response to a notification to that effect. Then, the waiting unit 240' notifies the selection instruction accepting unit 260' that the standby state was cancelled.

Next, the selection instruction accepting unit 260' determines that the DVD playback screen image corresponding to "chapter 8" was pressed based on press position information received from the state determination unit 200, and then sends selected-operation-key information representing the operation key corresponding to "chapter 5" to the operation control unit 220'.

In response thereto, the first processing execution control unit of the operation control unit 220' sends to the DVD player 160', an operation signal that prompts the DVD player to cancel video playback processings corresponding to the operation keys corresponding to "chapter 5" and "chapter 8". Further, the second processing execution control unit sends to the DVD player 160', an operation signal that prompts the DVD player to execute video playback processing corresponding to the selected operation key corresponding to "chapter 8". As shown in FIG. 10(c), the DVD player 160' generates a DVD playback screen image corresponding to "chapter 8" and displays the generated image on the display panel 280 in a full-screen mode.

Figure 11:
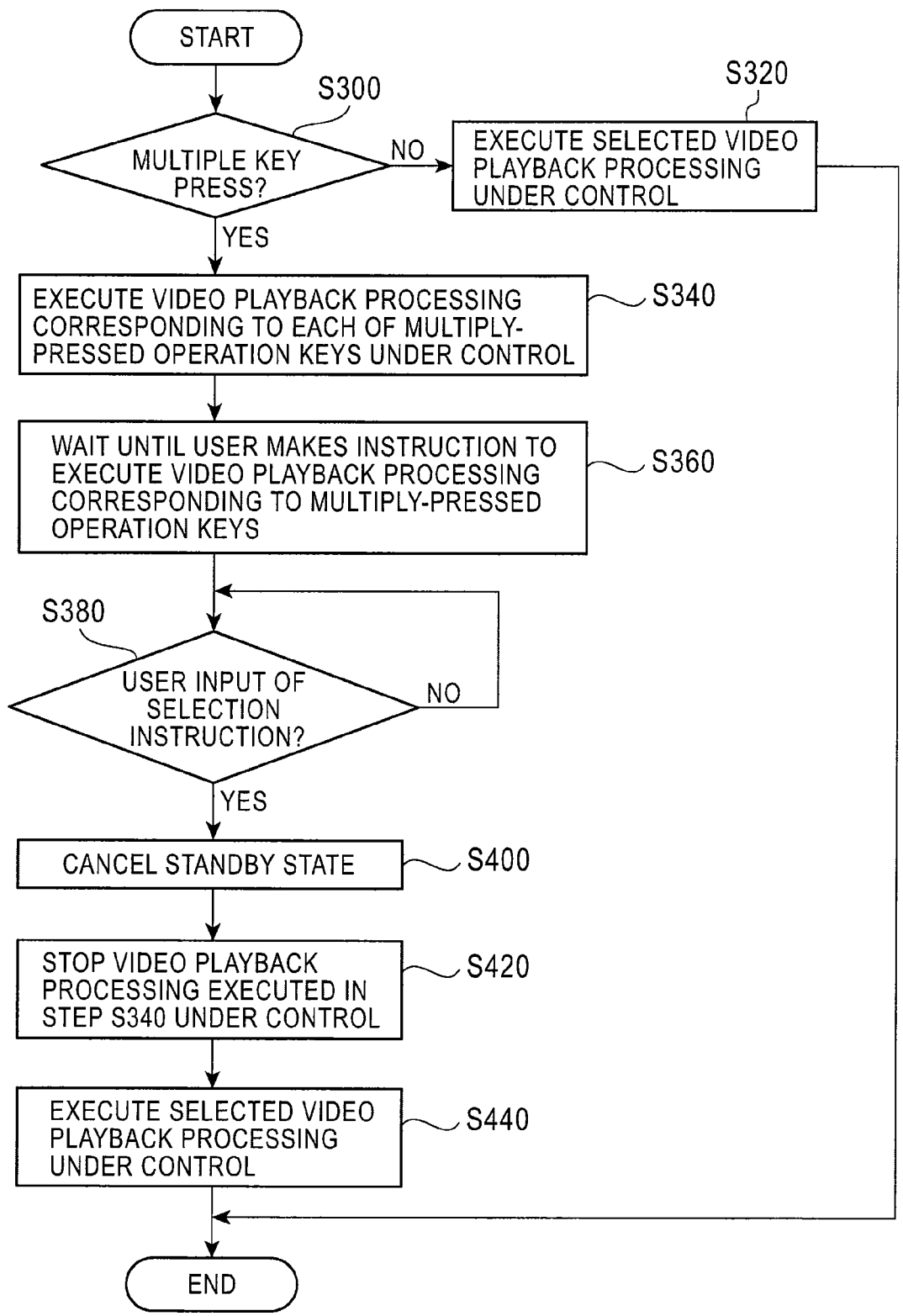
FIG. 11 is a flowchart showing operation of the touch panel input device according to the fourth embodiment.

Next, operations of the touch panel input device 120 of the fourth embodiment will be described. FIG. 11 is a flowchart showing operation of the touch panel input device 120. If a user presses an arbitrary position within an area assigned to each operation key (thumbnail image) displayed on the touch panel 300, processing in step S300 of FIG. 11 is started by the state determination unit 200, which receives press position information from the operation detection unit 320.

First, the state determination unit 200 determines whether multiple key press was applied to the touch panel 300 (step S300). If the state determination unit 200 determines that multiple key press was not applied to the touch panel 300 (NO in step S300), the state determination unit 200 sends operation key information corresponding to the press position information received from the operation detection unit 320, to the operation control unit 220'.

Then, the operation control unit 220' sends to the DVD player 160', an operation signal that prompts the DVD player to execute video playback processings of chapters corresponding to operation keys specified by the plural operation key information received from the state determination unit 200 (step S320). After the completion of processing in step S320, the processing of the touch panel input device 120 is terminated.

If the state determination unit 200 determines that multiple key press was applied to the touch panel 300 (YES in step S300), the state determination unit 200 sends plural operation key information to the operation control unit 220'. The first processing execution control unit of the operation control unit 220' sends to the DVD player 160', an operation signal that prompts the DVD player to execute video playback processings corresponding to plural multiply-pressed operation keys (step S340).

Next, the waiting unit 240' sets a standby state that causes processing to wait until a user makes a selection instruction to select and execute any one of video playback processings corresponding to the plural multiply-pressed operation keys (step S360). For example, if the waiting unit 240' receives two operation key information from the state determination unit 200, the waiting unit 240' sets such a state that causes processing to wait until a user selects and executes one of video playback processings corresponding to two operation keys specified by the two operation key information.

Next, the operation control unit 220' determines whether the selection instruction accepting unit 260' accepted a user's selection instruction to select and execute video playback processing corresponding to a standby operation key (step S380). If the operation control unit 220' determines that the selection instruction accepting unit 260' accepted no user's selection instruction (NO in step S380), the processing returns to step S380.

If the operation control unit 220' determines that the selection instruction accepting unit 260' accepted a user's selection instruction (YES in step S380), the waiting unit 240' cancels the standby state (step S400). Next, the first processing execution control unit of the operation control unit 220' sends a control signal for stopping the video playback processing executed in step S340 to the DVD player 160' (step S420). Finally, the operation control unit 220' sends to the DVD player 160', an operation signal that prompts the DVD player to execute video playback processing selected in step S380 (step S440). After the completion of processing in step S440, the processing of the touch panel input device 120 is terminated.

As described above in detail, in the fourth embodiment, in the case where it is uncertain which operation key (thumbnail image) corresponds to an intended chapter, if a user has a guess at a target operation key and multiply presses plural operation keys including the operation key, moving images of chapters corresponding to the plural multiply-pressed operation keys are displayed in a split-screen mode.

At this time, the user can select any one of the moving images displayed in the split-screen mode by touching a corresponding position on the screen. Thus, the user can execute intended video playback processing by confirming a target chapter through multiply key press and pressing an acceptance area in an intended moving image, following the multiple key press, without needing to return to a previous operation screen and repress another operation key. Thus, wasteful operations of the user can be eliminated to increase user convenience.

The fourth embodiment describes the case where an intended operation key displayed on the operation screen is pressed to thereby reproduce a chapter of a movie recorded on a DVD. However, an intended operation key displayed on the operation screen may be pressed to thereby reproduce broadcasting data received from a broadcasting station. A TV tuner is provided in place of the DVD player 160'. The TV tuner displays plural (for example, 9) moving images or still images that prompt a user to select and execute playback processing of broadcasting data received from any one broadcasting station on a touch panel screen (operation screen) (multi-window). A user can execute playback processing of broadcasting data received from an intended broadcasting station by pressing an arbitrary position within an area assigned to any one operation key.

Figure 12:
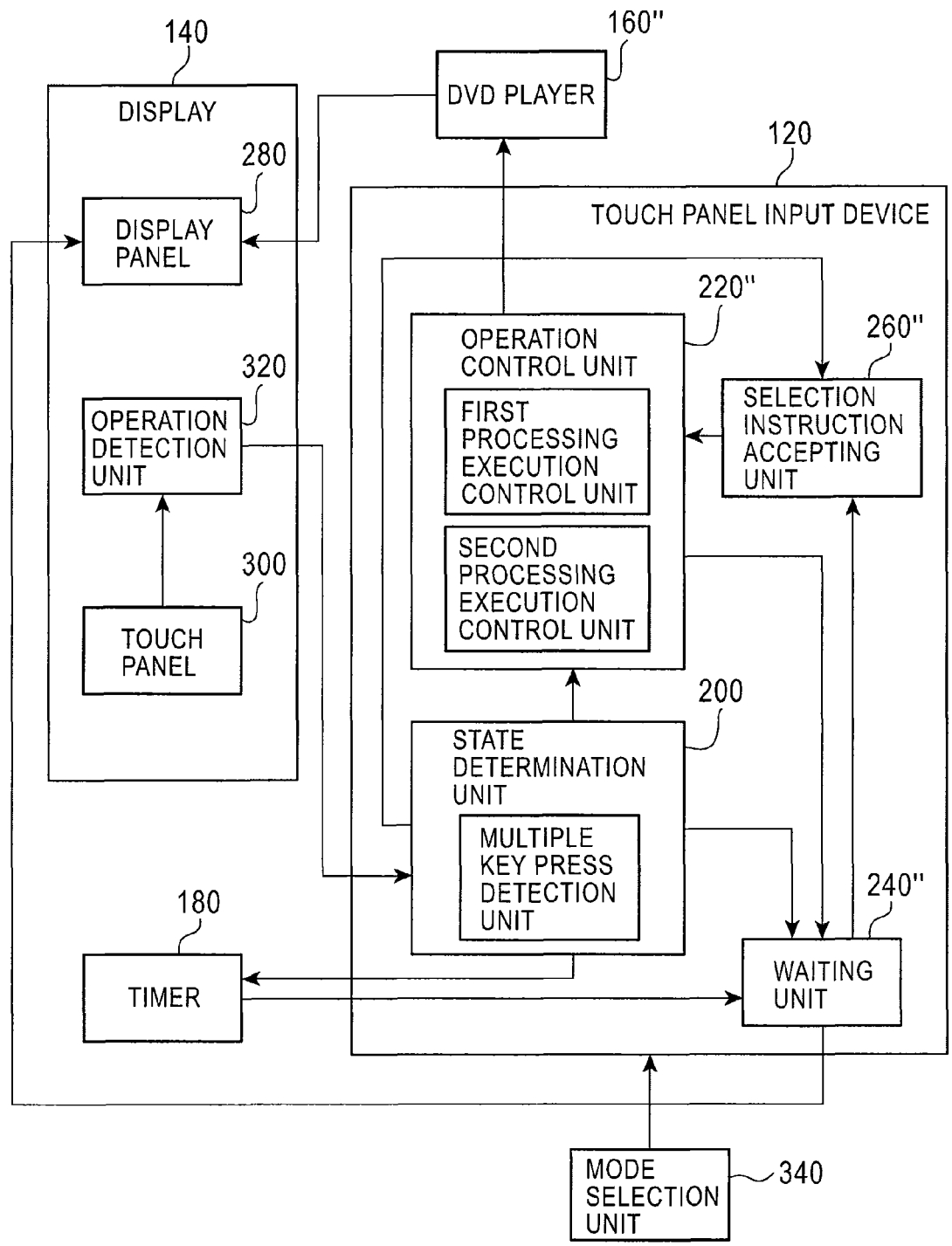
FIG. 12 is a block diagram of a touch panel input device according to a fifth embodiment of the present invention.
Figure 13:
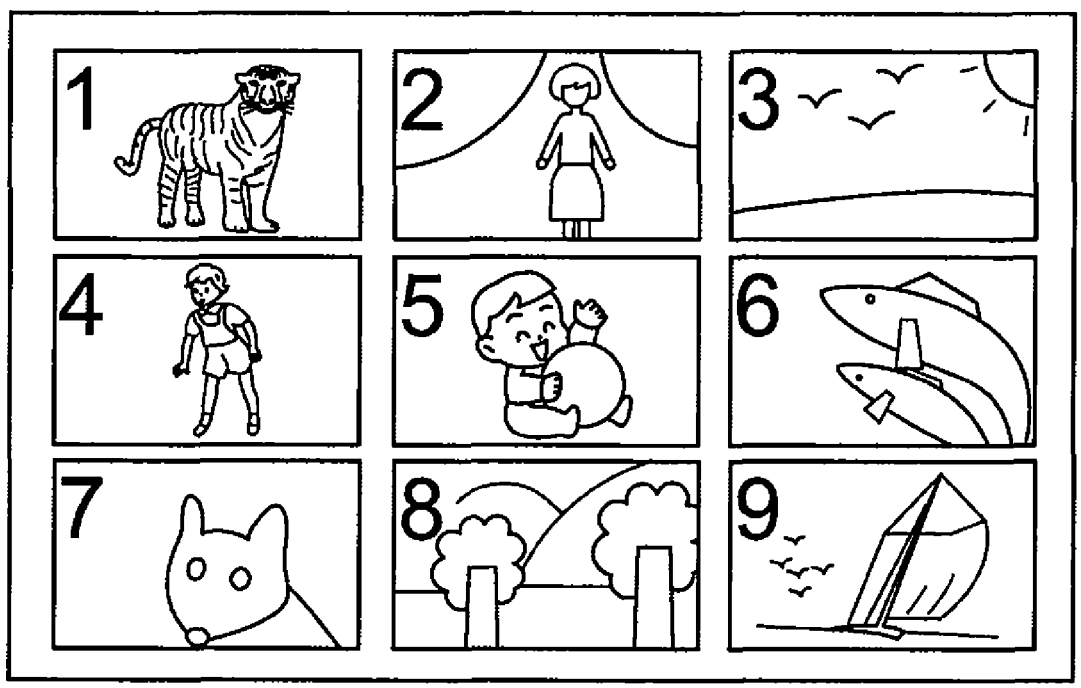
FIG. 13 shows an example of a touch panel screen displayed on a display panel.

Next, a fifth embodiment of the present invention will be. FIG. 12 is a block diagram showing a DVD playback system 100d including the touch panel input device 120. In FIG. 12, components given the same reference numerals as those of FIGS. 1 and 10 have similar function and thus, description thereof is not repeated here.

A feature of the fifth embodiment resides in the provision of a mode selection unit 340. A DVD player 160" has functions of both of the DVD player 160 and the DVD player 160'. An operation control unit 220" has functions of both of the operation control unit 220 and the operation control unit 220'. Further, a waiting unit 240" has functions of both of the waiting unit 240 and the waiting unit 240'. Further, the selection instruction accepting unit 260" has functions of both of the selection instruction accepting unit 260 and the selection instruction accepting unit 260'. The mode selection unit 340 switches between the functions of the operation control unit 220, the waiting unit 240, and the selection instruction accepting unit 260 (first embodiment) and the functions of the operation control unit 220', the waiting unit 240', and the selection instruction accepting unit 260' (fourth embodiment).

Thus, in the case of selecting any one chapter to execute video playback processing of the selected chapter, a user can easily switch a mode of the touch panel input device 120 to an intended one depending on whether the user selects a desired chapter in a general way or the user intentionally multiply presses keys to confirm moving images of plural chapters, and then selects a desired chapter.

The first to third embodiments describe the case where if a user presses an icon displayed on the display panel 280 with the waiting unit 240, the selection instruction accepting unit 260 accepts a selection instruction to select and execute processing corresponding to the pressed icon. However, the present invention is not limited thereto.

For example, assuming that a voice command is input to prompt a user to make a selection instruction to select and execute processing corresponding to a standby operation key, the selection instruction accepting unit 260 may accept a selection instruction to select and execute processing corresponding to the input voice command. In this case, the waiting unit 240 does not display an icon on the display panel 280.

In this case, the voice command may be input by a user saying "Next", for example. At this time, if plural standby operation keys are displayed, the selection instruction accepting unit 260 accepts selection instructions to select and execute processings corresponding to the plural standby operation key in order each time the voice command "Next" registered in a voice command dictionary is input. This operation can reduce the number of voice commands compared with the case of setting voice commands corresponding to all operation keys, and reduce an amount of dictionary data necessary for setting the voice commands.

Further, the first to fifth embodiments describe the DVD playback system, the navigation system, and the music playback system as an example of the system including the touch panel input device 120, but any other system may include the touch panel input device 120. Furthermore, each of the first to fifth embodiments is described as an example for embodying the present invention and thus should not be construed as limiting the scope of the present invention.

Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

The invention claimed is:

1. A touch panel input device for controlling processing corresponding to a touching or pressing of an operation key displayed on a touch panel screen, the touch panel input device comprising:
    a multiple key press detection unit for detecting that a plurality of operation keys are multiply pressed, wherein each operation key has a corresponding pre-assigned fixed priority value;
    a first processing execution control unit for controlling, if the plurality of operation keys were multiply pressed, execution of processing corresponding to the operation key having a highest priority value of operation keys multiply pressed;
    a waiting unit configured to set a standby state that waits until a user makes a selection instruction corresponding to the plurality of operation keys multiply pressed;
    a selection instruction accepting unit for accepting the selection instruction during the standby state; and
    a second processing execution control unit for controlling, if the selection instruction accepting unit accepts the selection instruction, execution of processing based on the selection instruction; and
    wherein if the user fails to make a selection during the standby state, the second processing execution control unit controls execution of processing corresponding to the operation key of the plurality of operation keys multiply pressed having the highest priority value.

2. The touch panel input device according to claim 1, wherein the first processing execution control unit controls execution of processing corresponding to one of the plurality of operation keys multiply pressed, and
    the waiting unit sets a standby state that causes the first processing execution control unit to wait until a user selects processing corresponding to at least one operation key, other than an operation key corresponding to the processing executed with the first processing execution control unit among the plurality of operation keys multiply pressed.

3. The touch panel input device according to claim 1, wherein the waiting unit maintains the standby state for a predetermined period of time from when the plurality of operation keys were multiply pressed.

4. The touch panel input device according to claim 1, wherein the waiting unit displays an icon to facilitate selection by the user, processing corresponding to at least one of the plurality of operation keys multiply pressed, and
    if, during the predetermined period of time, the icon displaced on the touch panel screen is pressed, the selection instruction accepting unit accepts a selection instruction to select and execute processing corresponding to the pressed icon.

5. The touch panel input device according to claim 1, wherein if a voice command that prompts the user to make a selection instruction to select and execute processing corresponding to at least one operation key from among the plurality of operation keys multiply pressed, the selection instruction accepting unit accepts a selection instruction to select and execute processing corresponding to the received voice command.

6. The touch panel input device according to claim 1, wherein if a predetermined position in a preset acceptance area on the touch panel screen is pressed, the selection instruction accepting unit accepts the selection instruction.

7. The touch panel input device according to claim 1, wherein if the multiple key press detection unit detects that the plurality of operation keys were multiply pressed, the first processing execution control unit controls execution of video playback processing corresponding to one of the plurality of operation keys multiply pressed;
    the waiting unit sets a standby state for waiting until a user makes a selection instruction to select and execute video playback processing corresponding to at least one operation key, other than an operation key corresponding to the video playback processing executed under control of the first processing execution control unit; and
    if the selection instruction accepting unit accepts the selection instruction, video playback processing executed under control of the first processing execution control unit is stopped, and the second processing execution control unit controls execution of video playback processing selected based on the selection instruction from among video playback processings corresponding to the plurality of operation keys multiply pressed.

8. The touch panel input device according to claim 1, wherein if the multiple key press detection unit detects that the plurality of operation keys were multiply pressed, the first processing execution control unit controls execution of each of video playback processings corresponding to the plurality of operation keys multiply pressed;
    the waiting unit sets a standby state for waiting until a user makes a selection instruction to select and execute one of the video playback processings corresponding to the plurality of operation keys multiply pressed; and
    if the selection instruction accepting unit accepts the selection instruction, video playback processing executed under control of the first processing execution control unit is stopped, and the second processing execution control unit controls execution of video playback processing selected based on the selection instruction from among the video playback processings corresponding to the plurality of operation keys multiply pressed.

9. The touch panel input device according to claim 1, wherein if the multiple key press detection unit detects that the plurality of operation keys were multiply pressed, the first processing execution control unit controls execution of character input processing corresponding to one of the plurality of operation keys multiply pressed;
    the waiting unit sets a standby state for waiting until a user makes a selection instruction to select and execute character input processing corresponding to at least one operation key, other than the operation key corresponding to the character input processing executed under control of the first processing execution control unit, from among the plurality of operation keys multiply pressed; and
    if the selection instruction accepting unit accepts the selection instruction, a character input operation executed under control of the first processing execution control unit is cancelled, and the second processing execution control unit controls execution of character input processing based on the selection instruction from among character input processings corresponding to the plurality of operation keys multiply pressed.

10. The touch panel input device according to claim 1, wherein if the multiple key press detection unit detects that the plurality of operation keys were multiply pressed, the first processing execution control unit controls execution of music playback processing corresponding to one of the plurality of operation keys multiply pressed;

the waiting unit sets a standby state for waiting until a user makes a selection instruction to select and execute music playback processing corresponding to at least one operation key, other than the operation key corresponding to the music playback processing executed under control of the first processing execution control unit, from among the plurality of operation keys multiply pressed; and if the selection instruction accepting unit accepts the selection instruction, the music playback processing executed under control of the first processing execution control unit is cancelled, and the second processing execution control unit controls execution of music playback processing selected based on the selection instruction from among music playback processings corresponding to the plurality of operation keys multiply pressed.

11. The touch panel input device according to claim 1, wherein if the multiple key press detection unit detects that the plurality of operation keys were multiply pressed, the first processing execution control unit controls execution of menu startup processing corresponding to one of the plurality of operation keys multiply pressed;

the waiting unit sets a standby state for waiting until a user makes a selection instruction to select and execute menu startup processing corresponding to at least one operation key, other than the operation key corresponding to the menu startup processing executed under control of the first processing execution control unit, from among the plurality of operation keys multiply pressed; and if the selection instruction accepting unit accepts the selection instruction, a menu started under control of the first processing execution control unit is closed, and the second processing execution control unit controls execution of menu startup processing selected based on the selection instruction from among menu startup processings corresponding to the plurality of operation keys multiply pressed.

12. A processing execution method for controlling execution of processing corresponding to a touch or press of an operation key displayed on a touch panel screen, the method comprising:

detecting that a plurality of operation keys displayed on the touch panel screen are multiply pressed, wherein each operation key has a corresponding pre-assigned fixed priority value;

controlling, if it is detected that the plurality of operation keys were multiply pressed, execution of processing corresponding to the operation key having a highest priority value of operation keys multiply pressed;

setting a standby state to wait until a user makes a selection instruction to select an operation key corresponding to at least one of the plurality of operation keys multiply pressed;

accepting the selection instruction if the standby state is set; and controlling, if the selection instruction is accepted, execution of processing selected based on the selection instruction from among processings corresponding to the plurality of operation keys multiply pressed; and wherein if the user fails to make a selection during the standby state, then controlling execution of processing corresponding to the operation key of the plurality of operation keys multiply pressed having the highest priority value.

13. The processing execution method according to claim 12, further including controlling execution of processing corresponding to one of the plurality of operation keys multiply pressed; and setting a standby state for waiting until a user makes a selection instruction to select and execute processing corresponding to at least one operation key other than the operation key corresponding to the processing executed.

* * * * *